US011800583B1

(12) United States Patent
Orito

(10) Patent No.: US 11,800,583 B1
(45) Date of Patent: Oct. 24, 2023

(54) COMMUNICATION SYSTEM AND DEVICE

(71) Applicant: Mitsubishi Electric Corporation, Tokyo (JP)

(72) Inventor: Koichi Orito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/036,166

(22) PCT Filed: Jun. 9, 2021

(86) PCT No.: PCT/JP2021/021965
§ 371 (c)(1),
(2) Date: May 10, 2023

(87) PCT Pub. No.: WO2022/259432
PCT Pub. Date: Dec. 15, 2022

(51) Int. Cl.
*H04W 4/00* (2018.01)
*H04W 76/14* (2018.01)
(Continued)

(52) U.S. Cl.
CPC .......... *H04W 76/14* (2018.02); *H04W 12/06* (2013.01); *H04W 12/50* (2021.01)

(58) Field of Classification Search
CPC ...... H04W 76/14; H04W 12/50; H04W 12/06
(Continued)

(56) References Cited

U.S. PATENT DOCUMENTS 8,014,722 B2 * 9/2011 Abel .................... H04L 63/0428
455/414.1
8,150,416 B2 * 4/2012 Ribaudo ................. G06F 16/95
455/456.2

(Continued)

FOREIGN PATENT DOCUMENTS

JP 2015-053565 A 3/2015
JP 2018-013882 A 1/2018
(Continued)

OTHER PUBLICATIONS

International Search Report and Written Opinion dated Sep. 7, 2021, received for PCT Application PCT/JP2021/021965, filed on Jun. 9, 2021, 26 pages including English Translation.

*Primary Examiner* — Marceau Milord
(74) *Attorney, Agent, or Firm* — XSENSUS LLP

(57) ABSTRACT

A communication system includes a first device and a plurality of second devices, and each of the second devices includes a pairing processing unit, a device information storage unit, and a data control unit. The pairing processing unit performs a pairing process including an authentication process with the first device by using device-specific information of the second device. The device information storage unit stores device information including pairing authentication information. The pairing processing unit performs, by using device-specific information of another second device the pairing process between the first device and the another second device, and stores the pairing authentication information in the device information storage unit. The data control unit transmits the pairing authentication information to the another second device. The data control unit of the another second device stores the received pairing authentication information in the device information storage unit.

19 Claims, 13 Drawing Sheets

(51) Int. Cl.
*H04W 12/50* (2021.01)
*H04W 12/06* (2021.01)

(58) Field of Classification Search
USPC .................................................. 370/328, 329
See application file for complete search history.

(56) References Cited

U.S. PATENT DOCUMENTS

| | | | | |
|---|---|---|---|---|
| 8,564,727 B2* | 10/2013 | Okuda | ............... | H04N 21/4108 348/725 |
| 8,666,313 B2* | 3/2014 | Preston | ................. | H04W 12/50 370/310 |
| 8,886,118 B2* | 11/2014 | Reuss | ................... | H04W 8/005 370/255 |
| 8,953,099 B2* | 2/2015 | Kwak | ............. | H04N 21/42204 345/169 |
| 8,954,003 B2* | 2/2015 | Chen | ..................... | H04W 12/04 455/410 |
| 9,042,823 B2* | 5/2015 | Palin | ..................... | H04W 8/005 455/410 |
| 9,338,495 B2* | 5/2016 | Reams | ............. | H04N 21/43615 |
| 10,447,786 B1* | 10/2019 | Arnberg | ................. | H04W 12/35 |
| 10,492,238 B2* | 11/2019 | Su | .......................... | G08C 17/02 |
| 2008/0271073 A1* | 10/2008 | Kim | ................. | H04N 21/42204 348/E5.103 |
| 2009/0325491 A1* | 12/2009 | Bell | ..................... | H04L 63/0823 370/352 |
| 2012/0075538 A1 | 3/2012 | Okuda | | |
| 2012/0196536 A1 | 8/2012 | Koo et al. | | |
| 2013/0241714 A1* | 9/2013 | Nakano | ................... | G08C 17/02 340/12.5 |
| 2016/0198198 A1 | 7/2016 | Iwami et al. | | |
| 2018/0184464 A1* | 6/2018 | Fang | ..................... | H04L 67/12 |
| 2019/0116334 A1* | 4/2019 | Lim | ................... | H04N 21/4108 |
| 2019/0253243 A1* | 8/2019 | Zimmerman | ........... | H04W 4/80 |
| 2019/0261433 A1 | 8/2019 | Turner et al. | | |
| 2019/0281642 A1* | 9/2019 | Su | ......................... | H04W 84/18 |
| 2020/0169460 A1* | 5/2020 | Bartlett | ................... | H04L 67/12 |

FOREIGN PATENT DOCUMENTS

| | | |
|---|---|---|
| JP | 2018-085710 A | 5/2018 |
| WO | 2010/146806 A1 | 12/2010 |

* cited by examiner

| SINK DEVICE | SOURCE DEVICE | CONNEC-TION STATE | RECEPTION STATE | COMMUNICA-TION PARTNER |
|---|---|---|---|---|
| aaa | s-xxx | CONNECTED | RECEIVING | s-xxx |
| aab | s-xxx | CONNECTED | NOT YET RECEIVING | - |
| aaa | s-yyy | UNCON-NECTED | - | s-xxx |
| | | | | |
| | | | | |
| | | | | |
| | | | | |

FIG.9

| ACCESS LEVEL | SINK DEVICE |
|---|---|
| 1 | aaa |
| 2 | aaa, aab |
| 3 | aaa, aab, aac |
| 4 | aaa, aab, aac, abb |
| 5 | aaa, aab, aac, abb, acc, bbb |
| | |
| | |
| | |
| | |

FIG.10

| DATA TYPE | ACCESS LEVEL |
|---|---|
| a | 1 |
| b | 2 |
| c | 3 |
| d | 4 |
| e | 5 |
| | |
| | |
| | | ns
COMMUNICATION SYSTEM AND DEVICE

CROSS-REFERENCE TO RELATED APPLICATION

The present application is based on PCT filing PCT/JP2021/021965, filed Jun. 9, 2021, the entire contents of which are incorporated herein by reference.

FIELD

The present disclosure relates to a communication system that performs communication between devices on which a pairing process has been performed, and a device.

BACKGROUND

Patent Literature 1 discloses a pairing method in which in a system including a digital TV, a moving-image playback device connected to the digital TV via high-definition multimedia interface (HDMI) (registered trademark)-consumer electronics control (CEC), and a radio frequency remote control paired with the digital TV in advance, pairing is performed between the moving-image playback device and the remote control. In the pairing method described in Patent Literature 1, the digital TV already paired with the remote control transmits identification information of the remote control to the moving-image playback device, and the moving-image playback device generates pairing information including the identification information of the moving-image playback device. Thereafter, the moving-image playback device transmits the generated pairing information to the digital TV, and the digital TV transmits the received pairing information to the remote control. Then, when receiving the pairing information, the remote control transmits pairing confirmation information to the moving-image playback device by wireless communication. The moving-image playback device receives the pairing confirmation information, and thereby the moving-image playback device confirms that pairing with the remote control has been completed. Consequently, without a pairing process between the moving-image playback device and the remote control of the digital TV performed by the user, the remote control can directly exchange signals not only with the digital TV but also with the moving-image playback device.

CITATION LIST

Patent Literature

Patent Literature 1: WO 2010/146806 A

SUMMARY

Technical Problem

Meanwhile, at a manufacturing site where a product is manufactured by using a plurality of control devices for controlling an object to be controlled, a sensor for detecting a state of the object to be controlled, and the like, there is a demand that a display collect data from the control devices, the sensor, and the like, and distribute processed data obtained by processing the collected data to a worker working at the manufacturing site. At the manufacturing site, source devices are arranged at a plurality of positions in the manufacturing site, the source devices being wireless communication devices that each distribute, by wireless communication, processed data from the display to a sink device which is a device that receives the processed data. The sink device is held by a user involved with manufacture at the manufacturing site. At the manufacturing site, wireless communication is performed in a sufficiently wide range as compared with a range assumed in Patent Literature 1, and therefore the source devices are arranged in the manufacturing site so that the wireless communication ranges which are radio wave output ranges of the source devices slightly overlap. For example, a case will be considered where the technology described in Patent Literature 1 is applied in a case where a sink device is paired with a second source device, the sink device being present in a first wireless communication range and being paired with a first source device that provides the first wireless communication range, and the second source device providing a second wireless communication range. According to the pairing method described in Patent Literature 1, the first source device transmits identification information of the sink device to the second source device, and the second source device generates pairing information including identification information of the second source device. Thereafter, the pairing information is transmitted to the sink device via the first source device, and the sink device transmits pairing confirmation information to the second source device by wireless communication. However, as described above, since the wireless communication ranges of the first source device and the second source device hardly overlap at the manufacturing site, unless the sink device is present in a range in which the first wireless communication range and the second wireless communication range overlap, the pairing confirmation information cannot be transmitted to the second source device by wireless communication, and there is a strong probability that the pairing process cannot be completed. Then, in a case where the second source device cannot receive the pairing confirmation information transmitted from the sink device, the second source device does not know completion of the pairing process with the sink device, so that data cannot be distributed from the second source device to the sink device.

The present disclosure has been made in view of the above, and an object thereof is to obtain a communication system in which a sink device in a paired state with a wireless communication device can complete a pairing process also with another wireless communication device at a position where wireless communication cannot be performed by the sink device.

Solution to Problem

In order to solve the above-described problems and achieve the object, the present disclosure is a communication system including: a first device capable of receiving data; and a plurality of second devices that generate distribution data to be distributed to the first device and are capable of wirelessly communicating with the first device, the plurality of second devices being connected via a network, in which each of the second devices includes a wireless communication unit, a pairing processing unit, a device information storage unit, a content generation unit, a distribution data processing unit, and a data control unit. The wireless communication unit performs wireless communication with the first device present in a wireless communication range that is a range in which the second device is capable of performing wireless communication. The pairing processing unit performs a pairing process including an authentication process with the first device by using device-specific information that is information specific to the second device. The device information storage unit stores device information including pairing authentication information that is information obtained by the pairing process and information used in wireless communication between the second device and the first device. The content generation unit generates the distribution data. The distribution data processing unit distributes the distribution data to the first device. The data control unit controls a flow of data in the second device. The pairing processing unit performs, by using device-specific information of another second device in the network, the pairing process between the first device and the another second device as a proxy for the another second device, and stores the pairing authentication information regarding the another second device in the device information storage unit. The data control unit transmits the pairing authentication information stored in the device information storage unit to the another second device via the network. The data control unit of the another second device stores the pairing authentication information that has been received in the device information storage unit.

Advantageous Effects of Invention

The communication system according to the present disclosure achieves an effect that a sink device in a paired state with a wireless communication device can complete a pairing process also with another wireless communication device at a position where wireless communication cannot be performed by the sink device.

BRIEF DESCRIPTION OF DRAWINGS

FIG. 9 is a diagram illustrating an example of access right management information held by the source device of the communication system according to the third embodiment.

FIG. 10 is a diagram illustrating an example of access level setting information held by the display of the communication system according to the third embodiment.

DESCRIPTION OF EMBODIMENTS

Hereinafter, a communication system and a device according to each embodiment of the present disclosure will be described in detail with reference to the drawings.

First Embodiment

Figure 1:
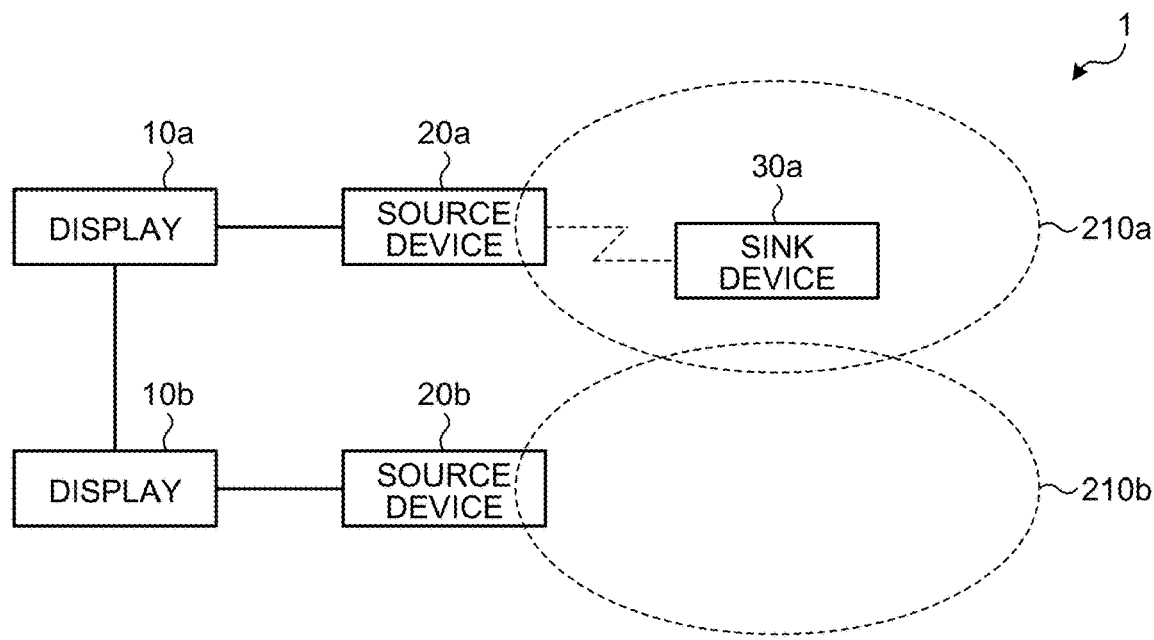
FIG. 1 is a diagram schematically illustrating an example of a configuration of a communication system according to a first embodiment.

FIG. 1 is a diagram schematically illustrating an example of a configuration of a communication system according to a first embodiment. Here, a case will be described where a communication system 1 is applied to a factory. The communication system 1 includes a plurality of displays 10a and 10b, a plurality of source devices 20a and 20b, and a sink device 30a. The plurality of displays 10a and 10b are connected via a wired or wireless network. The displays 10a and 10b are control devices that generate process information, which is information obtained by processing data acquired from a production device (not illustrated) provided in the factory, and output the process information. The displays 10a and 10b display the process information or distribute the process information to the sink device 30a respectively via the source devices 20a and 20b. The process information to be distributed to the sink device 30a is also referred to as distribution data. The plurality of displays 10a and 10b are connected via a network. The displays 10a and 10b are arranged at positions distant from each other in the factory in a state where the source devices 20a and 20b are respectively connected thereto. The displays 10a and 10b to which the source devices 20a and 20b are respectively connected are arranged so that the sink device 30a can be wirelessly connected to the source devices 20a and 20b at all positions in the factory. In one example, the displays 10a and 10b to which the source devices 20a and 20b are respectively connected are arranged in the factory so that ranges in which the two source devices 20a and 20b can perform wireless communication slightly overlap. The production device includes a control device such as a programmable controller, and a sensor that acquires a state of an object to be controlled. Hereinafter, in a case where the displays 10a and 10b are not distinguished from each other, each thereof is referred to as a display 10.

The source devices 20a and 20b are devices that are respectively connected to the displays 10a and 10b and can wirelessly communicate with the sink device 30a. In one example, the source devices 20a and 20b are each a universal serial bus (USB) dongle which is a portable wireless communication device having a USB plug. In that case, the source devices 20a and 20b are electrically connected to the displays 10a and 10b, respectively, by inserting the USB plug into a USB socket provided in each of the displays 10a and 10b, and thus the displays 10a and 10b can wirelessly communicate with the sink device 30a. Note that the source devices 20a and 20b may have a function of not only transmitting data but also receiving data by wireless communication. Hereinafter, in a case where the source devices 20a and 20b are not distinguished from each other, each thereof is referred to as a source device 20. The source device 20a can wirelessly communicate with the sink device 30a present in a wireless communication range 210a which is a radio wave output range of the source device 20a. The source device 20b can wirelessly communicate with the sink device 30a present in a wireless communication range 210b which is a radio wave output range of the source device 20b. Hereinafter, in a case where the wireless communication ranges 210a and 210b are not distinguished from each other, each thereof is referred to as a wireless communication range 210. The source devices 20a and 20b may be incorporated in the displays 10a and 10b, respectively, or may be attachable to and detachable from the displays 10a and 10b, respectively. A component obtained by connecting the source device 20a to the display 10a and a component obtained by connecting the source device 20b to the display 10b correspond to a second device and a device. In addition, the source devices 20a and 20b each correspond to a third device, and the displays 10a and 10b each correspond to a fourth device.

The sink device 30a is a device that can wirelessly communicate with the source device 20. The sink device 30a may be any device capable of receiving data. In one example, the sink device 30a is a wireless speaker, a set of wireless earphones, an intercommunication system, or the like. The sink device 30a corresponds to a first device.

The source device 20 and the sink device 30a are connected by wireless communication using Bluetooth (registered trademark) or the like. In the following embodiments, a case where the source device 20 and the sink device 30a wirelessly communicate by Bluetooth will be described as an example. Suppose that the sink device 30a has the following specification: while receiving data from one source device 20, the sink device 30a cannot receive data from another source device 20 simultaneously. In addition, suppose that N source devices 20 and M sink devices 30a are wirelessly connected, where N and M are natural numbers. In the following, a case where the display 10 distributes audio data as distribution data to the sink device 30a via the source device 20 will be described as an example, but the distribution data is not limited to audio data.

In FIG. 1, the sink device 30a is present in the wireless communication range 210a of the source device 20a and is present outside the wireless communication range 210b of the source device 20b. In the first embodiment, the source device 20a acquires information necessary for a pairing process of the source device 20b as another source device connected to the display 10b as another display in the network, and, when performing the pairing process with the sink device 30a, the source device 20a performs by proxy the pairing process of the source device 20b as another source device, as well. Then, the source device 20a transmits information obtained as a result of the pairing process to the source device 20b as another source device.

Figure 2:
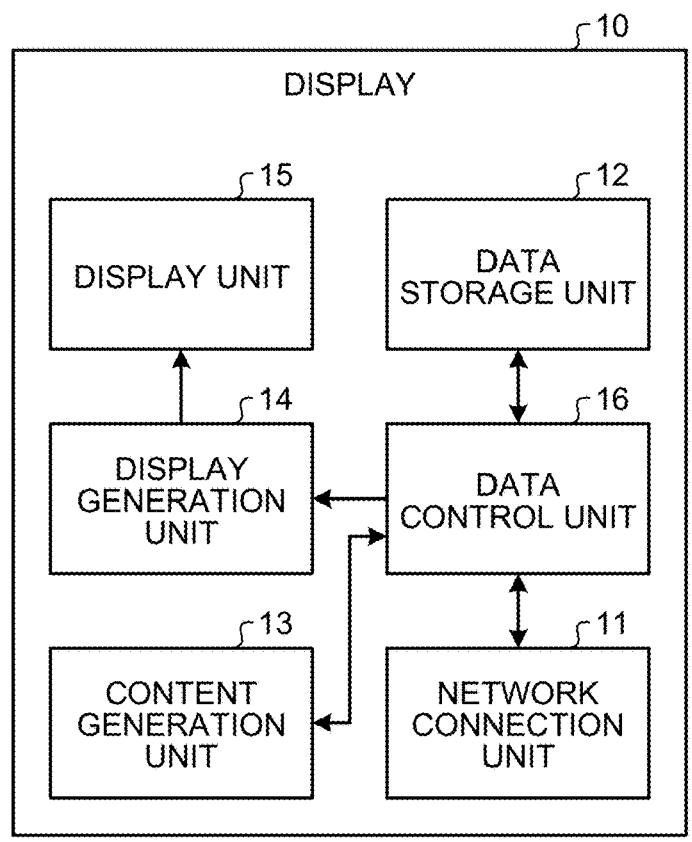
FIG. 2 is a block diagram illustrating an example of a configuration of a display used in the communication system according to the first embodiment.

FIG. 2 is a block diagram illustrating an example of a configuration of the display used in the communication system according to the first embodiment. The display 10 includes a network connection unit 11, a data storage unit 12, a content generation unit 13, a display generation unit 14, a display unit 15, and a data control unit 16.

Under the control of the data control unit 16, the network connection unit 11 transmits and receives data to and from external devices such as another display 10 and a production device by using a communication driver. In one example, control data is received from a production device connected to the display 10. In one example, the control data includes data calculated by the programmable controller in order to control an object to be controlled or data detected by the sensor. The control data is data in a binary format, a text format, or the like.

In addition, when the display 10 is started up, the network connection unit 11 generates connected device information which is information on a device connected to the display 10, transmits the connected device information to another display 10, and receives the connected device information from the another display 10. The device connected to the display 10 includes the source device 20 in addition to the production device. In the first embodiment, the connected device information includes information indicating the source device 20, information indicating the display 10 connected to the source device 20, and device-specific information which is information specific to the source device 20. An example of the information indicating the source device 20 is a name attached to the source device 20. An example of the information indicating the display 10 is a name attached to the display 10. Examples of the device-specific information include a media access control (MAC) address, a service identification (ID), and a character ID of the source device 20.

The data storage unit 12 stores data generated in the display 10 or data acquired by the display 10. In one example, the data storage unit 12 stores audio data generated by the content generation unit 13, audio data received from another display 10, control data received from the production device connected to the display 10, and the like.

The content generation unit 13 processes the control data to generate process information which is content. One of pieces of the process information is information to be displayed on the display unit 15. In addition, one of pieces of the process information is audio data which is distribution data audible by human ears. The content generation unit 13 generates audio data when receiving control data indicating an alarm. The generation of the audio data can be realized by a known technology. In one example, the content generation unit 13 generates audio data including a value of a current flowing through an object to be controlled.

The display generation unit 14 generates information for displaying, on the display unit 15, various types of information including the process information generated by the content generation unit 13. In one example, the display unit 15 generates a graphical user interface (GUI). The display unit 15 is a device that displays information to a worker or the like in the factory. An example of the display unit 15 is a liquid crystal module.

The data control unit 16 controls a flow of data in the display 10. In one example, the data control unit 16 controls transmission and reception of data in the network connection unit 11. In addition, the data control unit 16 writes the connected device information of the display 10 generated by the network connection unit 11 and the connected device information of another display 10 in a device information storage unit, which will be described later, of the source device 20. The data control unit 16 reads the connected device information in the device information storage unit of the source device 20, and extracts another display 10 connected to the source device that is wirelessly connected to the sink device 30a which is a transmission destination of audio data. The data control unit 16 transmits the audio data to the sink device 30a via the source device 20 connected to the display 10, or transmits the audio data to the extracted another display 10 via the network connection unit 11. In addition to the above, the data control unit 16 arbitrates data to be displayed on the display unit 15.

Figure 3:
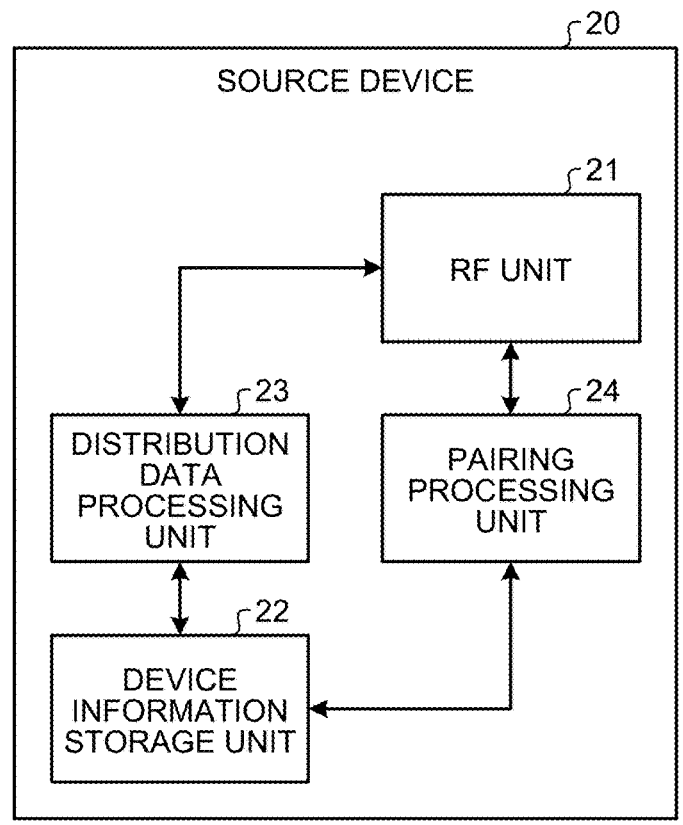
FIG. 3 is a block diagram illustrating an example of a configuration of a source device used in the communication system according to the first embodiment.

FIG. 3 is a block diagram illustrating an example of a configuration of the source device used in the communication system according to the first embodiment. The source device 20 includes a radio frequency (RF) unit 21, a device information storage unit 22, a distribution data processing unit 23, and a pairing processing unit 24.

The RF unit 21 is a wireless communication unit that wirelessly communicates with the sink device 30a. Here, the RF unit 21 converts the audio data from the display 10 into a radio wave signal and transmits the radio wave signal from an antenna to the sink device 30a. In a case where the sink device 30a is a device capable of transmitting and receiving data, the RF unit 21 receives a radio wave signal from the sink device 30a by an antenna, and converts the received radio wave signal into data.

The device information storage unit 22 stores device information which is information necessary for wireless communication with the sink device 30a. The device information includes connected device information which is information indicating a configuration of a device in the network to which the display 10 is connected, pairing authentication information which is information obtained by the pairing process, and pairing result information which is information indicating whether the pairing process has been performed between the sink device 30a and each source device 20, that is, a result regarding performance of the pairing process. The pairing authentication information includes device-specific information of the sink device 30a obtained by the pairing process. The pairing authentication information may further include key information used for communication between the sink device 30a and the source device 20 on which pairing has been performed.

The distribution data processing unit 23 distributes the audio data to the sink device 30a. Specifically, the distribution data processing unit 23 distributes, from the RF unit 21 to the sink device 30a, the audio data from the display 10 under the control of the data control unit 16 of the display 10. The distribution data processing unit 23 adjusts the timing of distributing the data with reference to the connected device information in the device information storage unit 22.

The pairing processing unit 24 performs the pairing process including an authentication process with the sink device 30a by using the device-specific information of the source device 20 and the device-specific information of the sink device 30a. In one example, the pairing process is a process of exchanging the device-specific information between the source device 20 and the sink device 30a and registering the device-specific information in each thereof. That is, when receiving a pairing request from the sink device 30a, the pairing processing unit 24 transmits the device-specific information of the source device 20 included in the connected device information in the device information storage unit 22 to the sink device 30a. In addition, the pairing processing unit 24 receives the device-specific information from the sink device 30a, registers the device-specific information of the sink device 30a in the pairing authentication information in the device information storage unit 22, and registers a combination of the sink device 30a and the source device 20 on which the pairing process has been performed in the pairing result information. In one example, regarding the pairing result information, it can be indicated, by registering the combination of the sink device 30a and the source device 20 on which the pairing process has been performed, that the pairing process has been performed. The pairing process is performed in accordance with Bluetooth standards.

In the first embodiment, the pairing processing unit 24 not only performs the pairing process between the source device 20 and the sink device 30a but also performs by proxy the pairing process between another source device in the network and the sink device 30a. At that time, the pairing processing unit 24 acquires the device-specific information of other source devices 20 in the network from the connected device information stored in the device information storage unit 22. The pairing processing unit 24 refers to the pairing result information stored in the device information storage unit 22 to select, among pieces of the acquired device-specific information, the device-specific information of the source device 20 on which the pairing process with the sink device 30a has not been performed. Then, the pairing processing unit 24 performs the pairing process with the sink device 30a by using the selected device-specific information of the source device 20, and registers, in the pairing authentication information, the device-specific information transmitted by the sink device 30a in association with the selected source device 20. As described above, in the pairing authentication information in the device information storage unit 22, not only the device-specific information of the sink device 30a obtained by the pairing process performed on the source device 20, but also the device-specific information of the sink device 30a regarding the source device 20 on which the pairing process has been performed by proxy is registered.

The data control unit 16 of the display 10 transmits the pairing authentication information and the pairing result information in the device information storage unit 22 of the source device 20 to another source device 20 in the network. This is performed in order to store the pairing authentication information and the pairing result information in the device information storage unit 22 of the source device 20 connected to another display 10. The data control unit 16 of the display 10 registers the pairing authentication information and the pairing result information received from another source device 20 in the network in the device information storage unit 22 of the source device 20.

Figure 4:
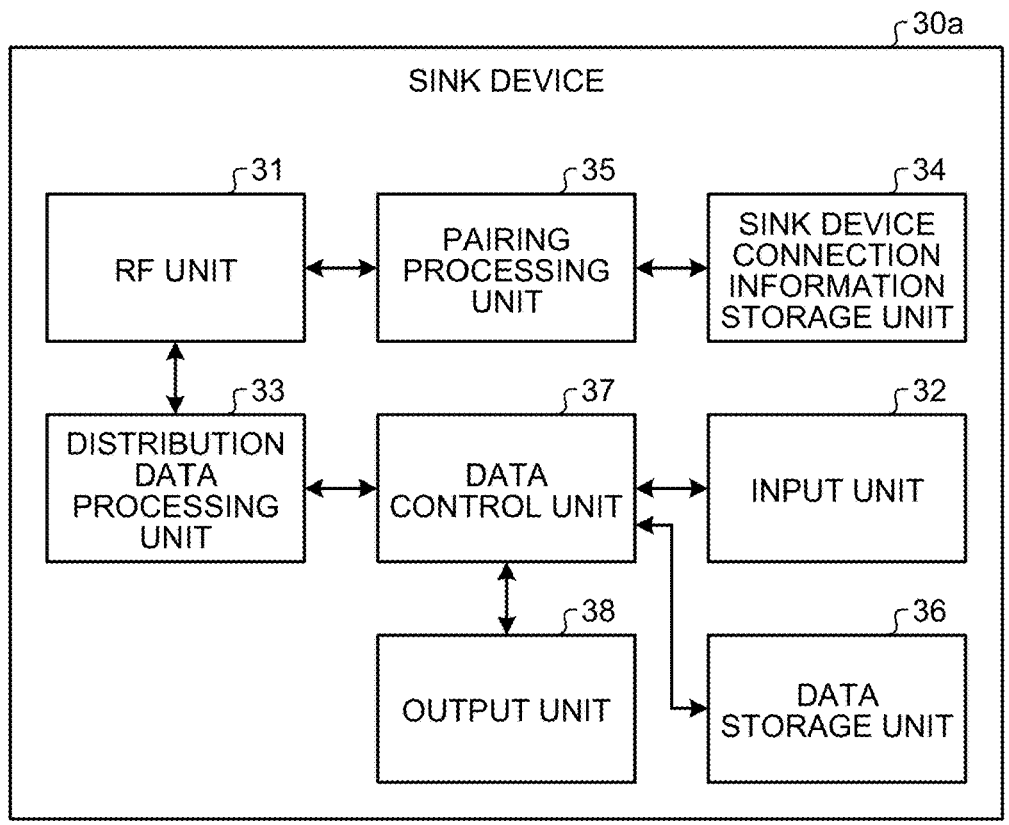
FIG. 4 is a block diagram illustrating an example of a configuration of a sink device used in the communication system according to the first embodiment.
Figure 5:
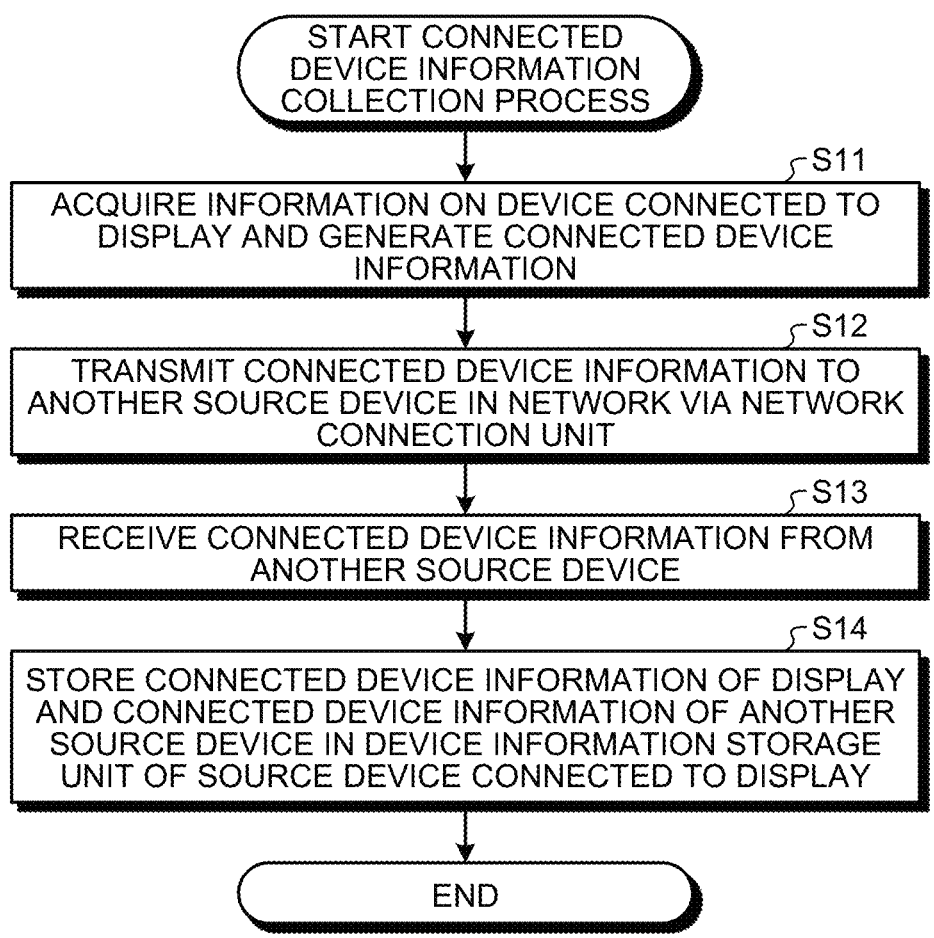
FIG. 5 is a flowchart illustrating an example of a procedure of a connected device information collection process performed by the display of the communication system according to the first embodiment.

FIG. 4 is a block diagram illustrating an example of a configuration of the sink device used in the communication system according to the first embodiment. The sink device 30a includes an RF unit 31, an input unit 32, a distribution data processing unit 33, a sink device connection information storage unit 34, a pairing processing unit 35, a data storage unit 36, a data control unit 37, and an output unit 38.

The RF unit 31 is a wireless communication unit that wirelessly communicates with the source device 20. Here, the RF unit 31 receives a radio wave signal from the source device 20 by an antenna, and converts the received radio wave signal into audio data. The RF unit 31 converts data from the input unit 32 into a radio wave signal and transmits the radio wave signal from an antenna to the source device 20.

The input unit 32 receives an input of information from a worker carrying the sink device 30*a*. The input unit 32 is a microphone, a volume button, or the like. In a case where the input unit 32 is a microphone, the input unit 32 outputs audio data to the data control unit 37, and in a case where the input unit 32 is a volume button, the input unit 32 outputs volume information selected by the volume button to the data control unit 37.

The distribution data processing unit 33 distributes, from the RF unit 31 to the source device 20, the data from the input unit 32 under the control of the data control unit 37.

The sink device connection information storage unit 34 stores sink device connection information which is information necessary for wireless communication with the source device 20. The sink device connection information includes registration information which is information necessary for performing the pairing process, and pairing authentication information which is information obtained by the pairing process. As the registration information, device-specific information for identifying the sink device 30*a*, for example, a MAC address, a service ID, and a character ID of the sink device 30*a* can be exemplified. The pairing authentication information includes device-specific information of the source device 20 obtained by the pairing process. The pairing authentication information may further include key information used for communication with the source device 20 on which pairing has been performed. The sink device connection information storage unit 34 corresponds to a first device connection information storage unit. The pairing authentication information stored in the sink device connection information storage unit 34 corresponds to first device-side pairing authentication information.

The pairing processing unit 35 performs the pairing process including the authentication process with the source device 20 by using the device-specific information of the source device 20 and the device-specific information of the sink device 30*a*. In one example, the pairing process is started by transmitting a pairing request. As described above, the pairing process is performed by exchanging the device-specific information with the source device 20 and registering the device-specific information. The pairing processing unit 35 registers the device-specific information of the source device 20 obtained as a result of the pairing process in the pairing authentication information in the sink device connection information storage unit 34.

The data storage unit 36 stores data generated in the sink device 30*a* or data acquired by the sink device 30*a*. In one example, the audio data distributed from the display and the data input from the input unit 32 are stored in the data storage unit 36.

The data control unit 37 controls a flow of data in the sink device 30*a*. In one example, the data control unit 37 outputs data received from the display 10 to the output unit 38. In addition, the data control unit 37 controls transmission of data from the input unit 32 to the source device 20.

The output unit 38 outputs audio data. An example of the output unit 38 is a speaker. Here, the audio data from the display 10 is output from the output unit 38.

Next, a description will be given for the pairing process in the communication system 1 described above. FIG. is a flowchart illustrating an example of a procedure of a connected device information collection process performed by the display of the communication system according to the first embodiment. Here, the source devices 20 are connected to the displays 10 as illustrated in FIG. 1. The above-described production device is also connected to each display 10 usually, but since the pairing process between each source device 20 and the sink device 30*a* will be described here, a description of the production device will be omitted.

First, when each of the displays 10 is started up, the network connection unit 11 acquires information on a device connected to the display 10 and generates connected device information (step S11). Here, the connected device information is information in which the device-specific information of the source device 20 connected to the display 10 and device type information indicating the type of a device connected to the display 10 are associated with the device-specific information and the device type information of the display 10. The device type information indicates types such as the source device 20 and the display 10.

Next, the data control unit 16 transmits the connected device information to another source device 20 in the network via the network connection unit 11 (step S12). The network connection unit 11 receives the connected device information from the another source device 20 (step S13). The data control unit 16 stores the connected device information of the display 10 and the connected device information of the another source device 20 in the device information storage unit 22 of the source device 20 connected to the display 10 (step S14). Thus, the connected device information collection process ends.

Although the case where the connected device information is exchanged among all the displays 10 in the network has been described here, the embodiment is not limited thereto. For example, when each of the displays 10 is started up, sink device position information regarding the presence or absence of the sink device 30*a* in the wireless communication range 210 of the source device 20 may be exchanged between the displays 10, the connected device information may be transmitted to the source device providing the wireless communication range 210 in which the sink device 30*a* is present, and the connected device information may not be transmitted to the source device 20 providing the wireless communication range 210 in which the sink device 30*a* is not present. The sink device position information may be included in the connected device information.

Figure 6:
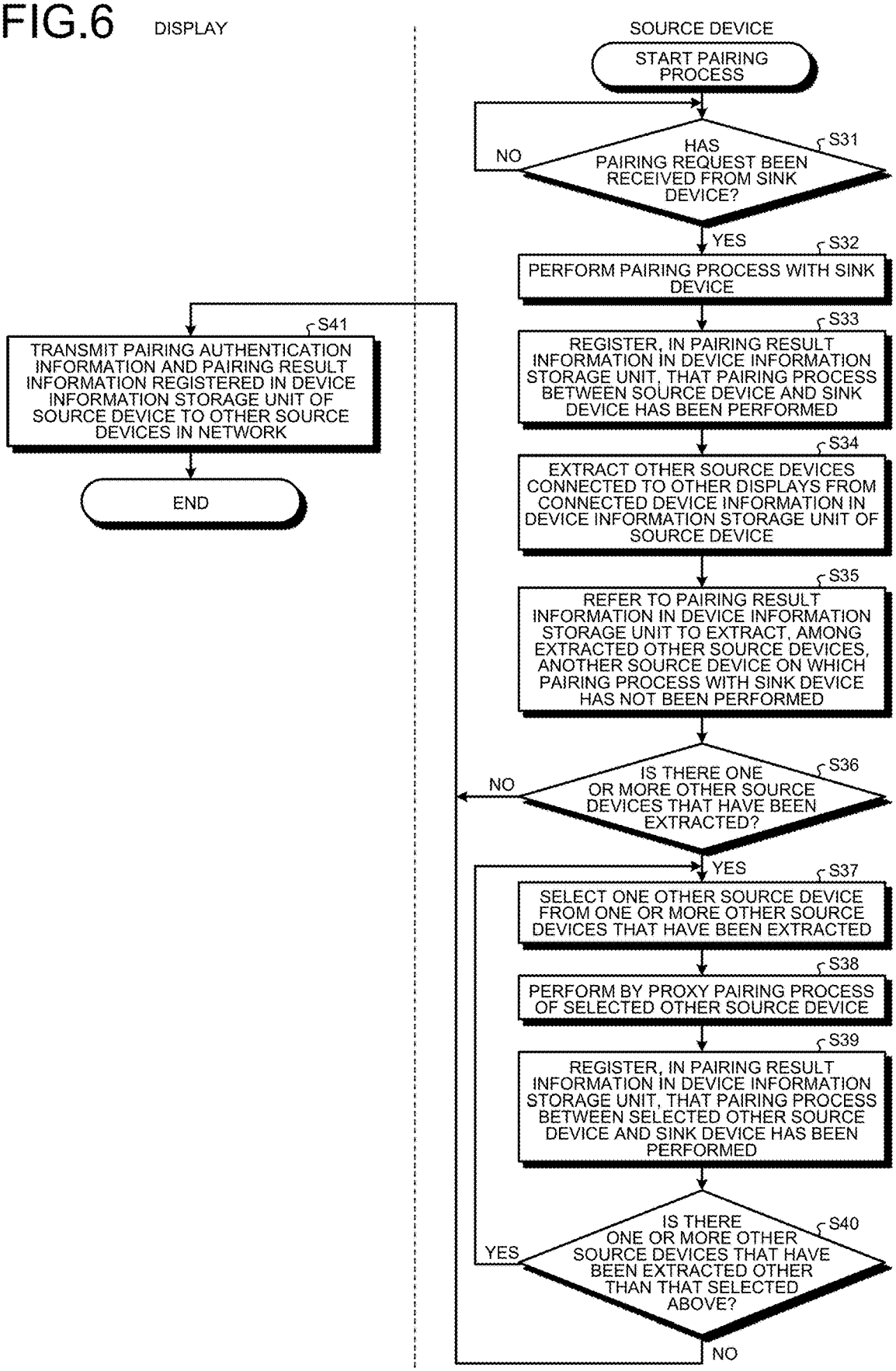
FIG. 6 is a flowchart illustrating an example of a procedure of a pairing process performed by the display and the source device of the communication system according to the first embodiment.

FIG. 6 is a flowchart illustrating an example of a procedure of a pairing process performed by the display and the source device of the communication system according to the first embodiment. The pairing processing unit 24 of the source device 20 determines whether a pairing request has been received from the sink device 30*a* (step S31). If the pairing request has not been received (No in step S31), a standby state is entered.

If the pairing request has been received (Yes in step S31), the pairing processing unit 24 of the source device 20 performs the pairing process with the sink device 30*a* (step S32). An example of the pairing process will be described below. When receiving the pairing request, the pairing processing unit 24 of the source device 20 transmits the device-specific information of the source device 20 to the sink device 30*a*. When receiving the device-specific information of the source device 20, the pairing processing unit 35 of the sink device 30*a* reads the device-specific information of the sink device 30*a* from the sink device connection information storage unit 34 and transmits the device-specific information to the source device 20. When receiving the device-specific information of the sink device 30*a*, the pairing processing unit 24 of the source device 20 transmits a confirmation code that indicates the reception of the device-specific information to the sink device 30*a*, and registers the received device-specific information of the sink device 30*a* in the pairing authentication information in the device information storage unit 22. The confirmation code is information indicating that the source device 20 has normally received the device-specific information of the sink device 30*a*. When receiving the confirmation code from the source device 20, the sink device 30*a* registers the device-specific information of the source device 20 in the pairing authentication information in the sink device connection information storage unit 34.

After the pairing process, the pairing processing unit 24 of the source device 20 registers, in the pairing result information in the device information storage unit 22, that the pairing process between the source device 20 and the sink device 30*a* has been performed (step S33).

Next, the pairing processing unit 24 of the source device 20 extracts other source devices 20 connected to other displays 10 from the connected device information in the device information storage unit 22 (step S34). The pairing processing unit 24 of the source device 20 refers to the pairing result information in the device information storage unit 22 to extract, among the extracted other source devices 20, another source device 20 on which the pairing process with the sink device 30*a* has not been performed (step S35). Then, the pairing processing unit 24 of the source device 20 determines whether there is one or more other source devices 20 that have been extracted (step S36).

If there is one or more other source devices 20 that have been extracted (Yes in step S36), the pairing processing unit 24 of the source device 20 selects one other source device 20 from the one or more other source devices 20 that have been extracted (step S37), and performs by proxy the pairing process of the selected other source device 20 (step S38).

An example of the pairing process performed by proxy will be described below. When receiving the pairing request, the pairing processing unit 24 of the source device 20 transmits the device-specific information of the selected other source device 20 to the sink device 30*a*. When receiving the device-specific information of the other source device 20, the pairing processing unit 35 of the sink device 30*a* reads the device-specific information of the sink device 30*a* from the sink device connection information storage unit 34 and transmits the device-specific information to the source device 20. When receiving the device-specific information of the sink device 30*a*, the pairing processing unit 24 of the source device 20 transmits a confirmation code that indicates the reception of the device-specific information to the sink device 30*a*, and registers the received device-specific information of the sink device 30*a* in the pairing authentication information in the device information storage unit 22. When receiving the confirmation code from the source device 20, the sink device 30*a* registers the device-specific information of the selected other source device 20 in the pairing authentication information in the sink device connection information storage unit 34.

After the pairing process, the pairing processing unit 24 of the source device 20 registers, in the pairing result information in the device information storage unit 22, that the pairing process between the selected other source device 20 and the sink device 30*a* has been performed (step S39).

Thereafter, the pairing processing unit 24 of the source device 20 determines whether there is one or more other source devices 20 that have been extracted other than that selected above (step S40). If there is one or more other source devices 20 that have been extracted other than that selected above (Yes in step S40), the process moves to step S37.

In addition, if there is no other source devices that have been extracted other than that selected above (No in step S40) or if there is no other source devices 20 that have been extracted in step S36 (No in step S36), the data control unit 16 of the display 10 transmits the pairing authentication information and the pairing result information registered in the device information storage unit 22 of the source device 20 to other source devices 20 in the network (step S41). Consequently, the pairing authentication information and the pairing result information of the source devices 20 in the network and the sink device 30*a* are stored in the device information storage units 22 of the other source devices 20, and the pairing process for each of the other source devices 20 is completed. Thus, the pairing process ends.

In a case where there are a plurality of sink devices 30*a*, the above-described pairing process is performed for each of the sink devices 30*a*.

After this pairing process, when the sink device 30*a* moves from the wireless communication range 210*a* of the source device 20*a* to the wireless communication range 210*b* of the source device 20*b*, communication between the source device 20*a* and the sink device 30*a* is disconnected. Then, the sink device 30*a* starts connection using the pairing authentication information of the source device 20*b* in the sink device connection information storage unit 34, and the source device 20*b* starts connection using the pairing authentication information of the sink device 30*a* in the device information storage unit 22.

In communication, the source device 20 transmits, to the sink device 30*a*, data including the device-specific information of the source device 20 and the device-specific information of the sink device 30*a* which is a transmission destination of audio data. The sink device 30*a* performs a reception process only on audio data including the device-specific information of the sink device 30*a* and the device-specific information of the source device 20 registered in the pairing authentication information, and ignores other audio data than that. Consequently, the sink device 30*a* can acquire and reproduce only the audio data addressed to the sink device 30*a*. The same applies to a case where audio data is transmitted from the sink device 30*a* to the source device 20. Consequently, it is possible to prevent audio data addressed to a certain worker from being received by another worker.

Although the case where the pairing authentication information is stored in the device information storage unit 22 of the source device 20 has been delineated in the above description, the pairing authentication information may be stored as a list in the data storage unit 12 of the display 10.

In the first embodiment, in the network including the plurality of displays 10 to each of which the source device 20 is connected, at least to the source device 20 with the wireless communication range 210 in which the sink device 30*a* is present, the connected device information of another source device 20 is transmitted. When the sink device 30*a* issues a pairing request to the source device 20, the pairing process is performed between the source device 20 and the sink device 30*a*, and thereafter, the source device 20 with the wireless communication range 210 in which the sink device 30a is present performs by proxy the pairing process between the another source device 20 and the sink device 30a. Then, the pairing authentication information obtained as a result of the pairing process between the source device 20 and the sink device 30a and the pairing process between the another source device 20 and the sink device 30a is transmitted to the another source device 20 via the network. The another source device 20 receives the pairing authentication information from the source device 20, and thereby the pairing process between the another source device 20 and the sink device 30a is completed. Consequently, the sink device 30a in the pairing state with the source device 20 can perform the pairing process also with the another source device at a position where wireless communication cannot be performed by the sink device 30a. In the case of FIG. 1, the sink device 30a in the pairing state with the source device 20a can perform the pairing process also with the source device 20b as another source device that provides the wireless communication range 210b that does not overlap or partially overlaps with the wireless communication range 210a of the source device 20a. As described above, it is possible to complete the pairing process also with the source device 20 that is not present in a range wirelessly communicable from the sink device 30a.

In a case not according to the first embodiment, after performing the pairing process with the source device 20a, the sink device 30a moves to the wireless communication range 210b of the source device 20b as another source device by the movement, disconnects the communication with the source device 20a, searches for the source device 20b to be connected next, performs the pairing process, and wirelessly communicates with the source device 20b as another source device. However, in the first embodiment, when performing the pairing process with the source device 20a that provides the wireless communication range 210a, the sink device 30a performs the pairing process also with the source device 20b as another source device that cannot wirelessly communicate with the sink device 30a. In a case of moving to the wireless communication range 210b of the source device 20b as another source device by the movement, it is possible to connect to the source device 20b as another source device by using the pairing authentication information obtained by the pairing process performed by proxy without searching for the source device 20b to be connected next. That is, the number of searches for the source devices 20 at the time of switching between the source devices 20 can be reduced.

In addition, the source device 20 that has performed the pairing process transmits, to other source devices 20 in the network, all pieces of the pairing authentication information and the pairing result information so as to be shared by the source devices 20 in the network. Consequently, when the source device 20 performs the pairing process with the sink device 30a, it is possible to determine whether another source device 20 has already performed the pairing process with the sink device 30a on which the pairing process is to be performed. As a result, the pairing process of the source device 20 that has already performed the pairing process can be prevented from being performed again.

Second Embodiment

Some sink devices 30a are configured to be able to hold only one piece of pairing authentication information. In that case, in the factory in which a plurality of source devices 20 are installed, the pairing process needs to be performed each time the wireless communication ranges 210 of the source devices 20 are switched from one to another. In a second embodiment, descriptions will be given for the display 10, the source device 20, and the communication system 1 capable of switching the source device 20 to be connected without performing the pairing process each time the wireless communication ranges 210 of the source devices are switched from one to another even in a case where the sink device 30a can hold only one piece of pairing authentication information.

Figures 7, 8:
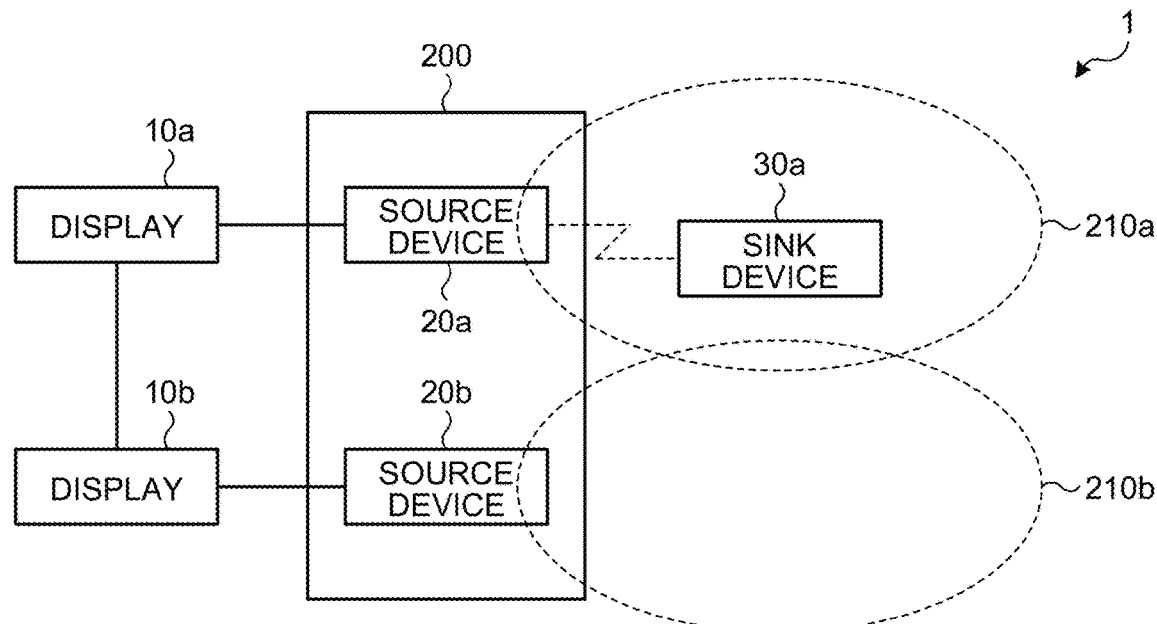
FIG. 7 is a diagram illustrating an example of a configuration of the communication system according to a second embodiment.
FIG. 8 is a diagram illustrating an example of sink device information held by the source device of the communication system according to a third embodiment.

FIG. 7 is a diagram illustrating an example of a configuration of the communication system according to the second embodiment. The configuration of the communication system 1 according to the second embodiment is similar to that in the first embodiment. In addition, the configurations of the display 10, the source device 20, and the sink device 30a constituting the communication system 1 are similar to those illustrated in FIGS. 1 to 4 of the first embodiment. However, as described above, the sink device connection information storage unit 34 of the sink device 30a can store only one piece of pairing authentication information. Similarly to the first embodiment, the source devices 20a and 20b may be respectively incorporated in the displays 10a and 10b, or may be respectively attachable to and detachable from the displays 10a and 10b. A component obtained by connecting the source device 20a to the display 10a and a component obtained by connecting the source device 20b to the display 10b correspond to the second device and the device. In addition, the source devices 20a and 20b each correspond to the third device, and the displays 10a and 10b each correspond to the fourth device. Furthermore, the sink device 30a corresponds to the first device.

In addition, all the source devices 20 connected to the displays 10 in the same network have a common virtual identifier. That is, in the second embodiment, all the source devices 20a and 20b in the network are set as one virtual source device 200, and the device-specific information for identifying the virtual source device 200 is set as the virtual identifier.

An outline of the pairing process using the virtual identifier will be described below. When receiving the pairing request from the sink device 30a, the pairing processing unit 24 of the source device 20 transmits not the device-specific information of the source device 20 but the virtual identifier to the sink device 30a. When receiving the virtual identifier, the pairing processing unit 35 of the sink device 30a reads the device-specific information of the sink device 30a from the sink device connection information storage unit 34 and transmits the device-specific information to the source device 20. When receiving the device-specific information of the sink device 30a, the pairing processing unit 24 of the source device 20 transmits a confirmation code that indicates the reception of the device-specific information to the sink device 30a, and registers the received device-specific information of the sink device 30a in the pairing authentication information in the device information storage unit 22. When receiving the confirmation code from the source device 20, the sink device 30a registers the virtual identifier in the pairing authentication information in the sink device connection information storage unit 34. Thereafter, the data control unit 16 of the display 10 transmits the pairing authentication information registered in the device information storage unit 22 of the source device 20 to other source devices 20. In one example, the pairing authentication information is transmitted to the other source devices 20 by broadcast. The pairing authentication information is transmitted at the first pairing process using the virtual identifier of the source device 20, and in addition, may be transmitted at a constant interval, for example, once per hour. The other source devices 20 register the received pairing authentication information in respective device information storage units 22. Consequently, the pairing process ends.

As described above, the source device 20 that first performs the pairing process with the sink device 30a transmits the pairing authentication information obtained as a result of the pairing process to the other source devices 20, and therefore, also in the second embodiment, the source device 20 that first performs the pairing process with the sink device 30a can be regarded as performing by proxy the pairing process between each of the other source devices 20 and the sink device 30a.

Note that one virtual identifier may be provided for all the sink devices 30a connected to the source devices 20, or one virtual identifier may be provided for each sink device 30a connected to the source device 20. In the latter case, there are virtual identifiers as many as the number of sink devices 30a. In the latter case, for example, the source device 20 to which the sink device 30a is connected for the first time may generate the virtual identifier. In that case, it is only required that the device-specific information of the sink device 30a and the generated virtual identifier be included in the pairing authentication information and transmitted to the other source devices 20.

In the communication in the case of the second embodiment, the device-specific information of the source device 20 to be included in the audio data is just replaced with the virtual identifier, and similarly to the case of the first embodiment, the audio data can be distributed from the source device 20 to the sink device 30a as a target. In addition, even if the source device 20 is switched by the handover of the sink device 30a, the sink device 30a does not need to perform the pairing process with the source device 20 to which the handover is performed.

In the second embodiment, in the network including a plurality of displays 10 to each of which the source device 20 is connected, all the source devices 20 are regarded as one virtual source device 200, and the virtual identifier is set. The source device 20 to which the sink device 30a is connected for the first time performs the pairing process with the sink device 30a using the virtual identifier, and transmits the device-specific information of the sink device 30a obtained as a result of the pairing process to other source devices 20. Then, data including the virtual identifier and the device-specific information of the sink device 30a is transmitted and received between the source device 20 and the sink device 30a. This achieves a state similar to a state in which the sink device 30a in the pairing state with the source device performs the pairing process also with another source device 20 with which the sink device 30a cannot wirelessly communicate. That is, it is equivalent to a state in which the pairing process with the source device 20 that is not present in a range wirelessly communicable from the sink device 30a is performed by proxy.

In addition, there is the following effect: even in a case where the sink device 30a that can hold only one piece of pairing authentication information performs handover in a situation where a plurality of source devices are arranged, for example, in the factory, communication can be continued without performing the pairing process with the source device 20 to which the handover is performed. Consequently, the sink device 30a having an inexpensive configuration can be introduced into the communication system 1. Furthermore, there is the following effect: since the sink device 30a only needs to perform the pairing process with any one of the source devices 20, under a situation where a plurality of source devices 20 are present, the number of pairing processes performed by the sink device 30a and the source device 20 can be reduced as compared with a conventional case.

Third Embodiment

While receiving the distribution of audio data from a certain source device 20, the sink device 30a cannot receive audio data addressed to the sink device 30a from another source device 20. In a case where audio data including an alarm is notified to the sink device 30a in the factory, it is necessary to prevent a situation in which the sink device 30a fails to receive the audio data from occurring. Therefore, in a third embodiment, descriptions will be given for the display 10, the source device 20, and the communication system 1 capable of distributing audio data to the sink device 30a without fail in the cases of the first and second embodiments.

The configurations of the communication system 1 according to the third embodiment and the display 10, the source device 20, and the sink device 30a constituting the communication system 1 are similar to those illustrated in FIGS. 1 to 4 of the first embodiment and FIG. 7 of the second embodiment. Hereinafter, differences from the first embodiment will be described.

The device information storage unit 22 of the source device 20 stores the device information, and the device information of the third embodiment includes sink device information and access right management information in addition to the connected device information, the pairing authentication information, and the pairing result information. The sink device information is information including the sink device 30a present in the wireless communication range 210 of the source device 20, a connection state of the sink device 30a to the source device 20, a reception state of audio data of the sink device 30a, and the source device 20 as a transmission source of the audio data in a case where the audio data is received. As will be described later, the sink device information includes not only information regarding the source device 20 but also information regarding another source device 20 in the network. The sink device information regarding the another source device 20 is information received from another display 10. The sink device information is updated at a predetermined interval, for example, in units of seconds.

FIG. 8 is a diagram illustrating an example of sink device information held by the source device of the communication system according to the third embodiment. The sink device information illustrated in FIG. 8 includes items of "sink device", "source device", "connection state", "reception state", and "communication partner". In the item of "sink device", information for identifying the sink device 30a, in one example, the device-specific information, is stored. In the item of "source device", information for identifying the source device 20 that provides the wireless communication range 210 in which the sink device 30a in the item of "sink device" is present, in one example, the device-specific information of the source device 20, is stored. In the item of "connection state", information indicating whether connection to the source device 20 is established is stored. In the item of "reception state", information indicating whether the sink device 30a is receiving audio data is stored. In addition, the item "reception state" may include information for identifying the audio data. In the item of "communication partner", information for identifying the source device 20 as a transmission source of the audio data is stored in a case where receiving is entered in the item of "reception state".

As illustrated in FIGS. 1 and 7, the wireless communication range 210 of the source device 20 partially overlaps with the wireless communication range 210 of another source device 20 adjacent thereto, so that in a case where the sink device 30a is present in such an overlapping range, the sink device 30a is present in the wireless communication ranges 210 of the plurality of source devices 20. Such a sink device 30a is registered in the sink device information a plurality of times. For example, in the example of FIG. 8, the sink device 30a of which the device-specific information is "aaa" is present in a range in which the wireless communication range 210 of the source device 20 of which the device-specific information is "s-xxx" and the wireless communication range 210 of the source device 20 of which the device-specific information is "s-yyy" overlap. It is indicated that the sink device 30a is connected to the source device 20 of which the device-specific information is "s-xxx" and is receiving the audio data. The values of the device-specific information illustrated in FIG. 8 are simplified for description and do not indicate actual values.

The access right management information is information specifying an access right of the sink device 30a. Specifically, the access right management information is information for managing audio data that can be accessed by the sink device 30a. FIG. 9 is a diagram illustrating an example of access right management information held by the source device of the communication system according to the third embodiment. The access right management information illustrated in FIG. 9 is information in which the sink device 30a is associated with an access level, and includes items of "access level" and "sink device". In the item of "access level", information is stored which specifies, by a level, the sink device 30a that can access audio data depending on a type of the audio data as described later. In this example, the access level is indicated by a numerical value. In the item of "sink device", information for identifying the sink device 30a, in one example, the device-specific information is stored.

It can be said that the smaller the number of associated sink devices 30a the access level has, the more important the information is. In addition, the larger the number of access levels the sink device 30a is associated with, the closer a position of a user thereof to an administrator who manages the entire factory, and the smaller the number of access levels the sink device 30a is associated with, the closer a position of a user thereof to a worker who works in each department of the factory. The values of the access levels and the device-specific information illustrated in FIG. 9 are simplified for description and do not indicate actual values.

The content generation unit 13 of the display 10 refers to access level setting information to set the access level of audio data, and generates the audio data including the access level. FIG. 10 is a diagram illustrating an example of the access level setting information held by the display of the communication system according to the third embodiment. The access level setting information is information in which a type of audio data to be generated is associated with an access level, and includes items of "data type" and "access level". In the item of "data type", a type of audio data is stored. Examples of the type of audio data include an alarm for the state of a device, and a notification about stockout. The "access level" is similar to the "access level" described in relation to the access right management information. In one example, the access level setting information is stored in the data storage unit 12.

The data control unit 16 of the display 10 acquires the sink device information from the source device 20, and stores the sink device information in the device information storage unit 22 of the source device 20 connected to the display 10. For example, the data control unit 16 can generate the sink device information regarding the source device 20 connected to the display 10 by acquiring the distribution status of audio data in the distribution data processing unit 23 of the connected source device 20, the radio field intensity of each sink device 30a from the RF unit 21, and the like. The data control unit 16 transmits and receives, via the network connection unit 11, the generated sink device information to and from another display 10 to which the source device in the network is connected. The data control unit 16 stores the sink device information of the source device 20 connected to the display 10 and the sink device information received from the another display 10 in the device information storage unit 22 of the source device 20.

The data control unit 16 of the display 10 distributes audio data generated by the content generation unit 13 to the display 10 having the source device 20 connected to the sink device 30a as a destination of the distribution. Specifically, when the audio data is generated by the content generation unit 13, the data control unit 16 reads the access level of the audio data, and refers to the access right management information in the device information storage unit 22 of the source device to extract the sink device 30a as a transmission destination of the audio data. The data control unit 16 refers to the sink device information in the device information storage unit 22 of the source device 20 to acquire the source device 20 to which the extracted sink device 30a is connected, and transmits, via the network connection unit 11, the audio data to the display 10 to which the acquired source device 20 is connected. In addition, the data control unit 16 receives audio data from the another display 10 via the network connection unit 11.

The sink device 30a which is a destination of the transmission of the audio data may be present in an overlapping range which is a range in which the wirelessly communicable ranges of two or more source devices 20 overlap, or may be present in a non-overlapping range which is a range other than the overlapping range and in which one source device 20 can perform wireless communication. It is determined that the sink device 30a is present in the overlapping range in a case where the sink device 30a is associated with a plurality of source devices 20 in the sink device information, and it is determined that the sink device 30a is present in the non-overlapping range in a case where the sink device 30a is associated with one source device 20 therein.

Regarding the sink device 30a present in the non-overlapping range, the data control unit 16 can issue, to the distribution data processing unit 23 of the source device 20 of the display 10, an instruction to distribute audio data without considering the distribution status of audio data in another source device 20.

Regarding the sink device 30a present in the overlapping range, the data control unit 16 arbitrates the distribution of audio data between the source device 20 and the another source device 20. Here, as an example, a case will be described where audio data is distributed to the sink device 30a present in the overlapping range from each of the displays 10 connected to the source devices 20. In one method, one source device 20 that provides an overlapping range is requested by another source device 20 to transmit audio data.

Figure 11:
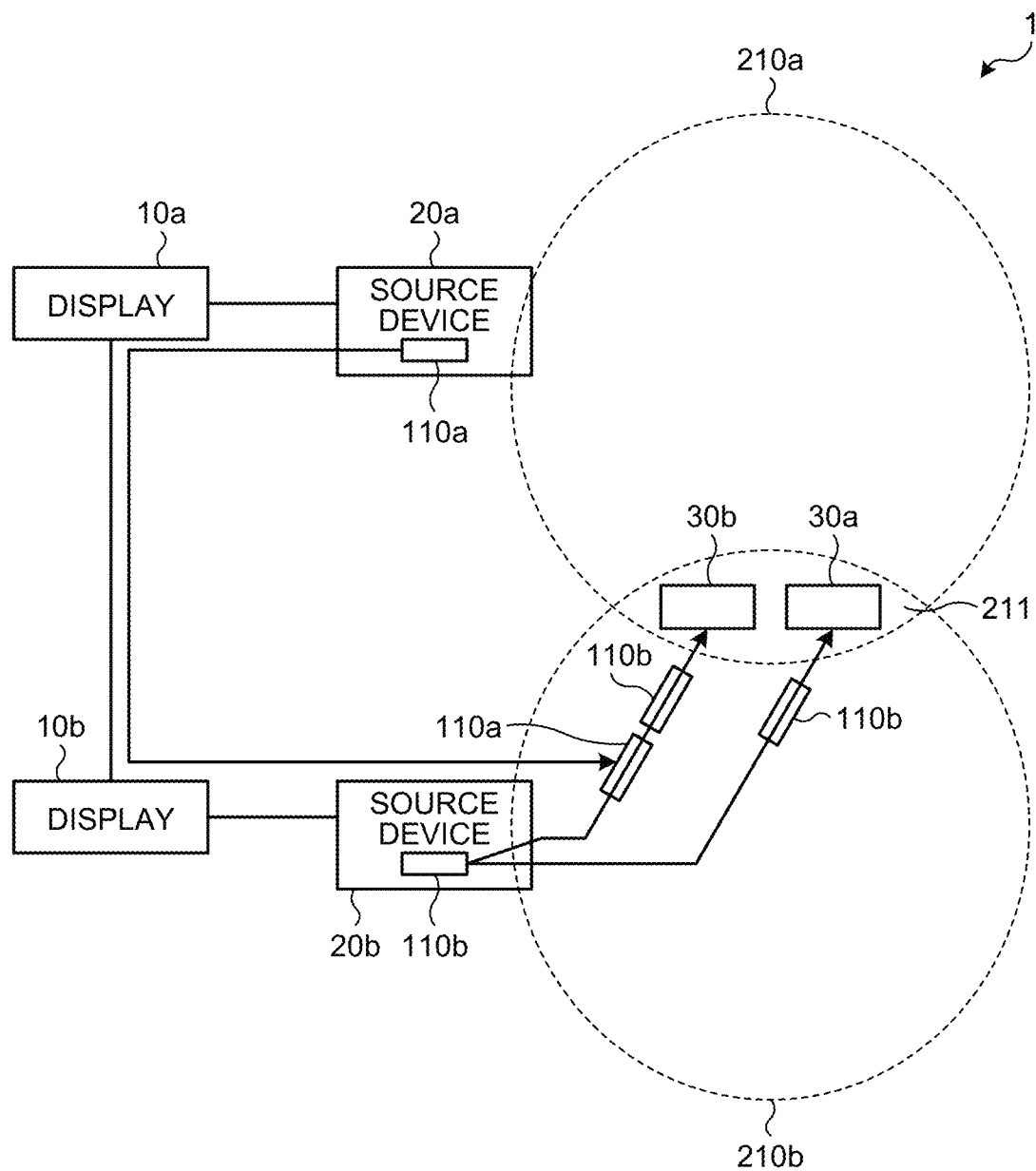
FIG. 11 is a diagram illustrating an example of how audio data is distributed in the communication system according to the third embodiment.

FIG. 11 is a diagram illustrating an example of how audio data is distributed in the communication system according to the third embodiment. Here, an example is illustrated in which the sink devices 30*a* and 30*b* are present in an overlapping range 211 in which the wireless communication range 210*a* of the source device 20*a* and the wireless communication range 210*b* of the source device 20*b* overlap. Then, a destination of audio data 110*a* generated by the display 10*a* is the sink device 30*b*, and destinations of audio data 110*b* generated by the display 10*b* are the sink devices 30*a* and 30*b*. In that case, the source device 20*a* requests the source device 20*b* to transmit the audio data 110*a*, and the source device 20*b* sequentially distributes the audio data 110*b* and 110*a* to the sink devices 30*a* and 30*b*.

As to which of the source device 20*a* or 20*b* distributes the audio data 110*a* and 110*b*, there are a method in which the source device 20 that has previously transmitted the audio data 110*a* and 110*b* to the sink devices 30*a* and 30*b* in the overlapping range 211 is adopted, a method in which priorities are set with respect to the source devices 20 in advance, and the like. In addition, such determination may be made on the basis of distances of the sink devices 30*a* and 30*b* from the source devices 20*a* and 20*b*. In one example, the distances from the source devices 20*a* and 20*b* can be determined using the signal strengths of the sink devices 30*a* and 30*b*. Then, the source device 20*a* or 20*b* having a higher signal strength may transmit the audio data 110*a* and 110*b*. The distances from the source devices 20*a* and 20*b* can be determined using not only the signal strength but also other known technologies.

Figure 12:
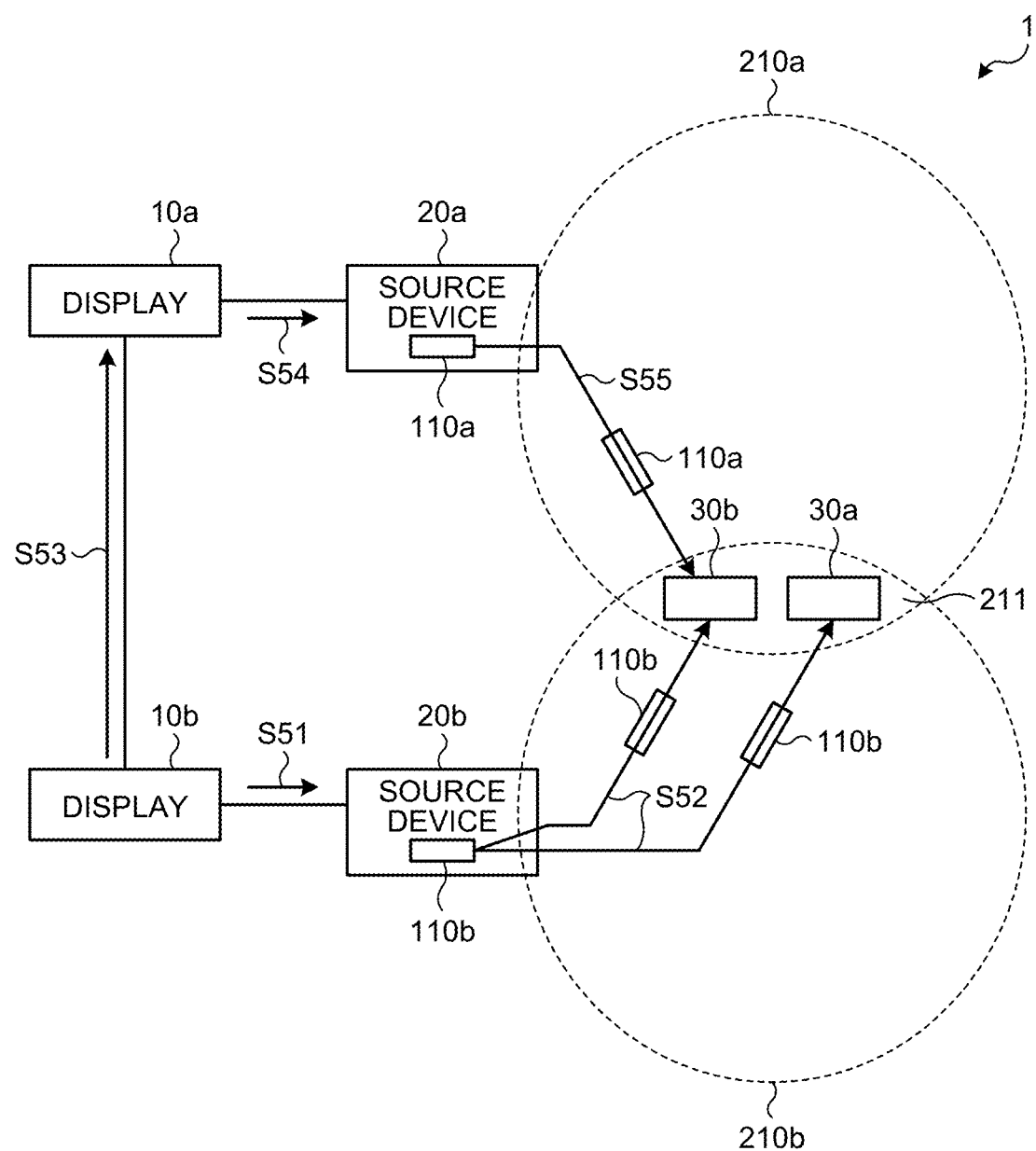
FIG. 12 is a diagram illustrating an example of how audio data is distributed in the communication system according to the third embodiment.

In another method, each of the source devices 20 transmits audio data to the sink device 30*a*, and the timing of transmission to the sink device 30*a* is arbitrated between the source devices 20. FIG. 12 is a diagram illustrating an example of how audio data is distributed in the communication system according to the third embodiment. In FIG. 12, step numbers indicating the order of distribution of the audio data are described, and the step numbers are referred to in the following description. Here, an example is illustrated in which the sink devices 30*a* and 30*b* are present in the overlapping range 211 in which the wireless communication range 210*a* of the source device 20*a* and the wireless communication range 210*b* of the source device 20*b* overlap. Then, a destination of the audio data 110*a* generated by the display 10*a* is the sink device 30*b*, and destinations of the audio data 110*b* generated by the display 10*b* are the sink devices 30*a* and 30*b*.

Here, the audio data 110*b* is distributed from the source device 20*b* to the sink devices 30*a* and 30*b*. That is, the data control unit 16 of the display 10*b* gives the distribution data processing unit 23 of the source device 20*b* an instruction to transmit the audio data 110*b* (step S51). Which of the source devices 20 distributes the audio data 110*a* or 110*b* first is determined by a method similar to those described above.

When receiving the instruction to transmit the audio data 110*b* from the display 10*b*, the distribution data processing unit 23 of the source device 20*b* acquires the access level included in the audio data 110*b*, and refers to the access right management information in the device information storage unit 22 to determine a transmission destination of the audio data 110*b*. Then, the distribution data processing unit 23 of the source device 20*b* transmits the audio data 110*b* to the sink devices 30*a* and 30*b* as targets via the RF unit 21 as described in the first or second embodiment (step S52). The data control unit 16 of the display 10*a* does not transmit the audio data 110*a* to the sink device 30*b* until receiving a synchronization signal indicating that the transmission of the audio data 110*b* from the display 10*b* to the sink device 30*b* has been finished.

When the transmission of the audio data 110*b* to the sink device 30*a* is finished, the data control unit 16 of the display 10*b* transmits a synchronization signal to the display 10*a* (step S53). When receiving the synchronization signal, the data control unit 16 of the display 10*a* instructs the distribution data processing unit 23 of the source device 20*a* to transmit the audio data 110*a* to the sink device 30*b* (step S54).

When receiving the instruction to transmit the audio data 110*a* from the display 10*a*, the distribution data processing unit 23 of the source device 20*a* acquires the access level included in the audio data 110*a*, and refers to the access right management information in the device information storage unit 22 to determine a transmission destination of the audio data 110*a*. Then, the source device 20*a* transmits the audio data 110*a* to the sink device 30*a* as a target via the RF unit 21 as described in the first or second embodiment (step S55).

Figure 13:
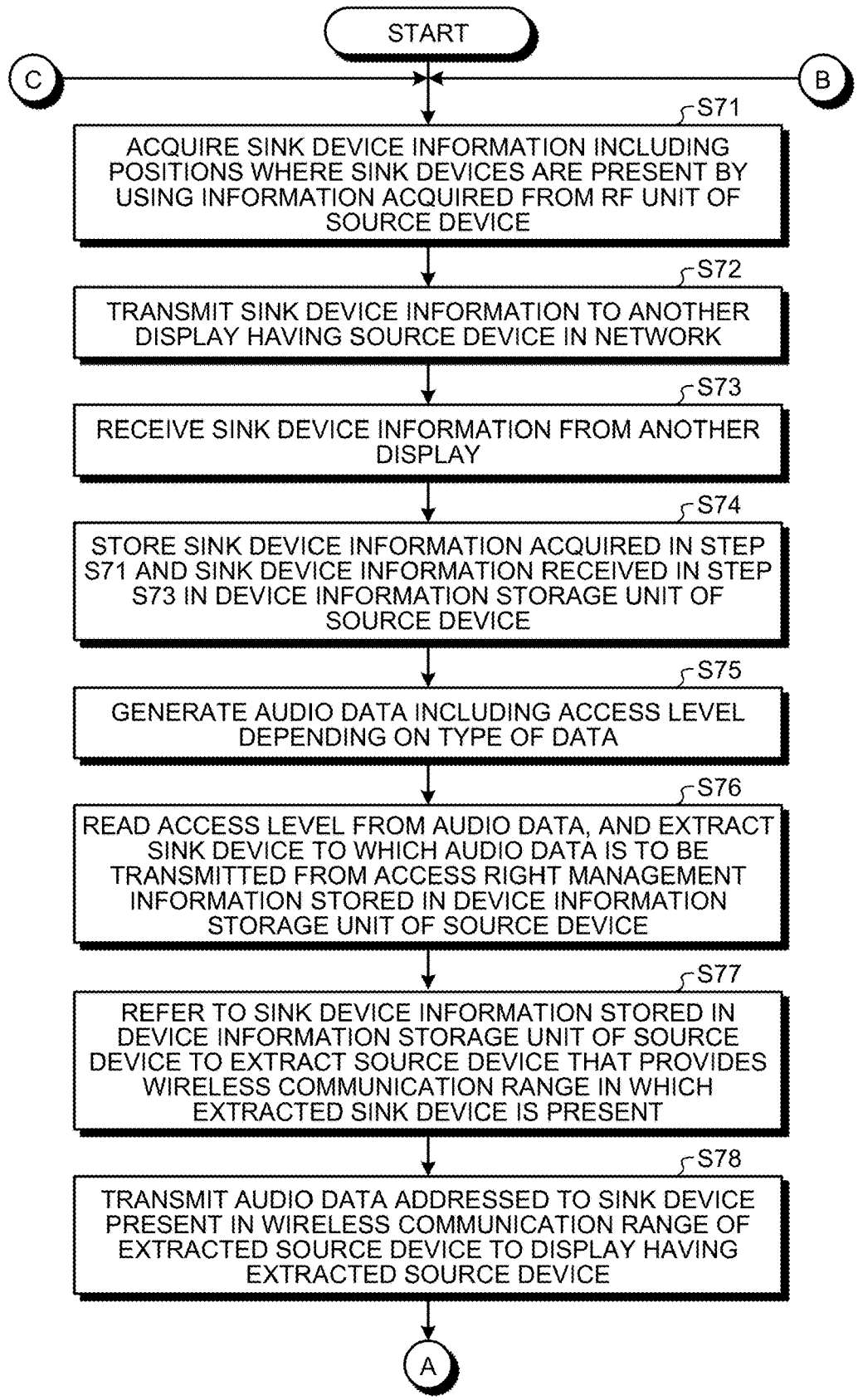
FIG. 13 is a flowchart illustrating an example of a procedure of a data distribution method performed by the display of the communication system according to the third embodiment.
Figure 14:
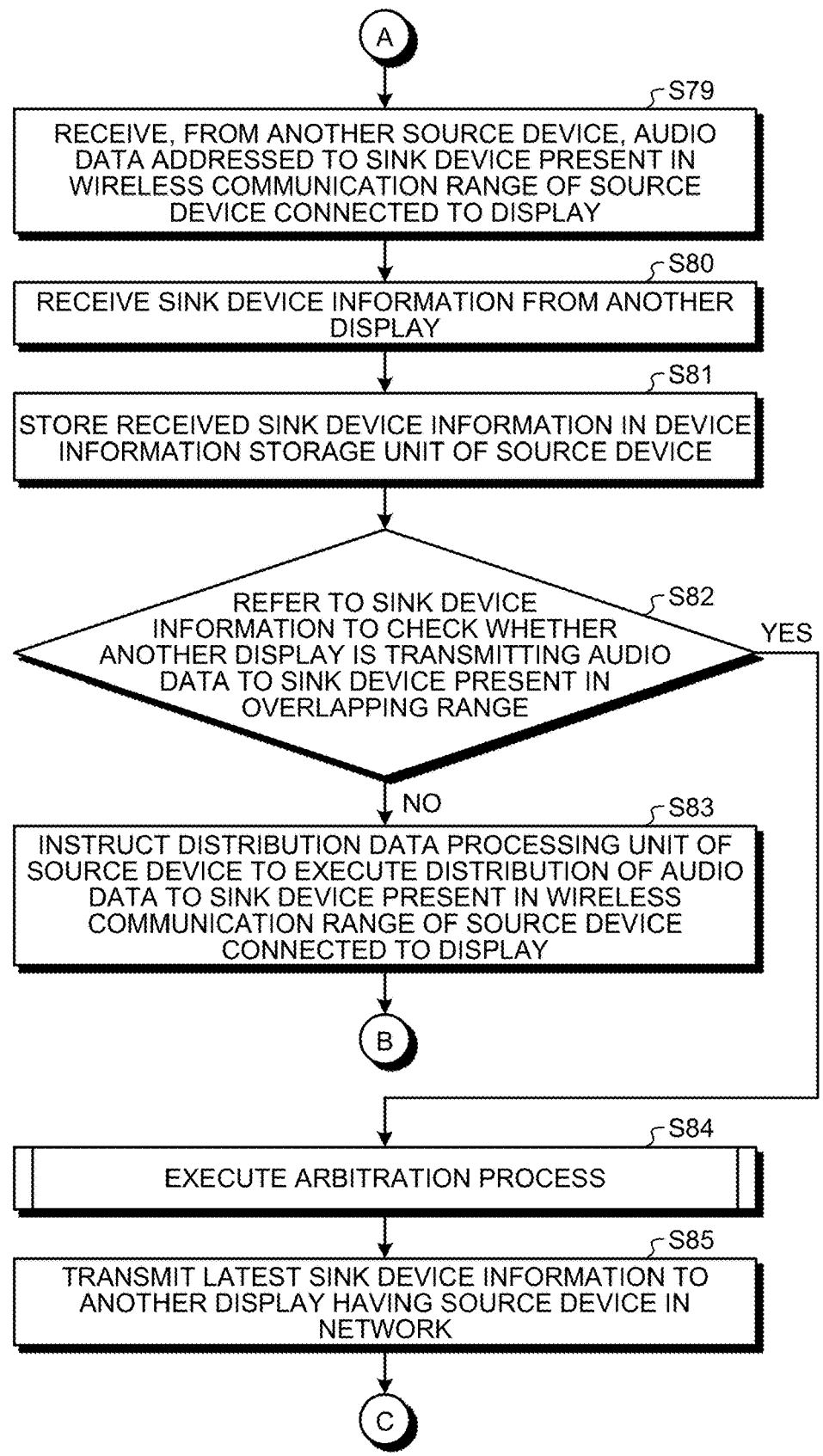
FIG. 14 is a flowchart illustrating an example of a procedure of a data distribution method performed by the display of the communication system according to the third embodiment.

Next, a data distribution method in the communication system 1 according to the third embodiment will be described. FIGS. 13 and 14 are each a flowchart illustrating an example of a procedure of a data distribution method performed by the display of the communication system according to the third embodiment. Here, a description will be given using, as an example, a process performed by the display 10*a* in a case where the display 10*a* intends to transmit the audio data 110*a* to the sink device 30*b* when the display 10*b* is transmitting the audio data 110*b* to the sink devices 30*a* and 30*b* in the overlapping range 211 in FIG. 11 or 12. As illustrated in FIG. 11 or 12, the sink device 30*a* is also present in the overlapping range 211, but the display 10*a* does not transmit the audio data 110*a* to the sink device 30*a* due to the access level set in the audio data 110*a*.

First, the data control unit 16 of the display 10*a* acquires the sink device information including the positions where the sink devices 30*a* and 30*b* are present by using the information acquired from the RF unit 21 of the source device 20*a* (step S71). Next, the data control unit 16 transmits the sink device information to the display 10*b* as another display having the source device 20*b* in the network (step S72). In addition, the data control unit 16 receives the sink device information from the display 10*b* as another display (step S73). The data control unit 16 stores the sink device information acquired in step S71 and the sink device information received in step S73 in the device information storage unit 22 of the source device 20*a* (step S74).

Thereafter, the content generation unit 13 generates the audio data 110*a* including the access level depending on the type of data (step S75). The data control unit 16 reads the access level from the audio data 110*a*, and extracts a sink device to which the audio data 110*a* is to be transmitted from the access right management information stored in the device information storage unit 22 of the source device 20*a* (step S76). For simplicity of description, FIGS. 11 and 12 each illustrate a case where such a sink device is not present in the wireless communication range 210 other than the wireless communication ranges 210*a* and 210*b*, and the non-overlapping range of the wireless communication ranges 210*a* and 210*b*, and the sink device 30*b* is present in the overlapping range 211. The sink device 30*a* in the overlapping range 211 is not a destination of the transmission of the audio data 110*a* due to the access level.

Next, the data control unit 16 refers to the sink device information stored in the device information storage unit 22 of the source device 20*a* to extract the source device 20 that provides the wireless communication range 210 in which the extracted sink device is present (step S77). The data control unit 16 transmits the audio data 110*a* addressed to the sink device present in the wireless communication range 210 of the extracted source device 20 to the display 10 having the extracted source device 20 (step S78). In addition, the data control unit 16 receives, from another source device 20, audio data addressed to a sink device present in the wireless communication range 210 of the source device 20 connected to the display 10a (step S79).

Thereafter, when receiving the sink device information from another display 10b (step S80), the network connection unit 11 stores the received sink device information in the device information storage unit 22 of the source device 20a (step S81). The network connection unit 11 refers to the sink device information to check whether the display 10b as another display is transmitting the audio data 110b to the sink device 30b present in the overlapping range 211 (step S82). If the display 10b as another display is not transmitting the audio data 110b to the sink device 30b present in the overlapping range 211 (No in step S82), the data control unit 16 instructs the distribution data processing unit 23 of the source device 20a to execute distribution of the audio data 110a to the sink device 30b present in the wireless communication range 210a of the source device 20a connected to the display 10a (step S83). Thereafter, the process returns to step S71.

On the other hand, if the display 10b as another display is transmitting the audio data 110b to the sink device 30b present in the overlapping range 211 (Yes in step S82), the data control unit 16 executes an arbitration process (step S84).

Figure 15:
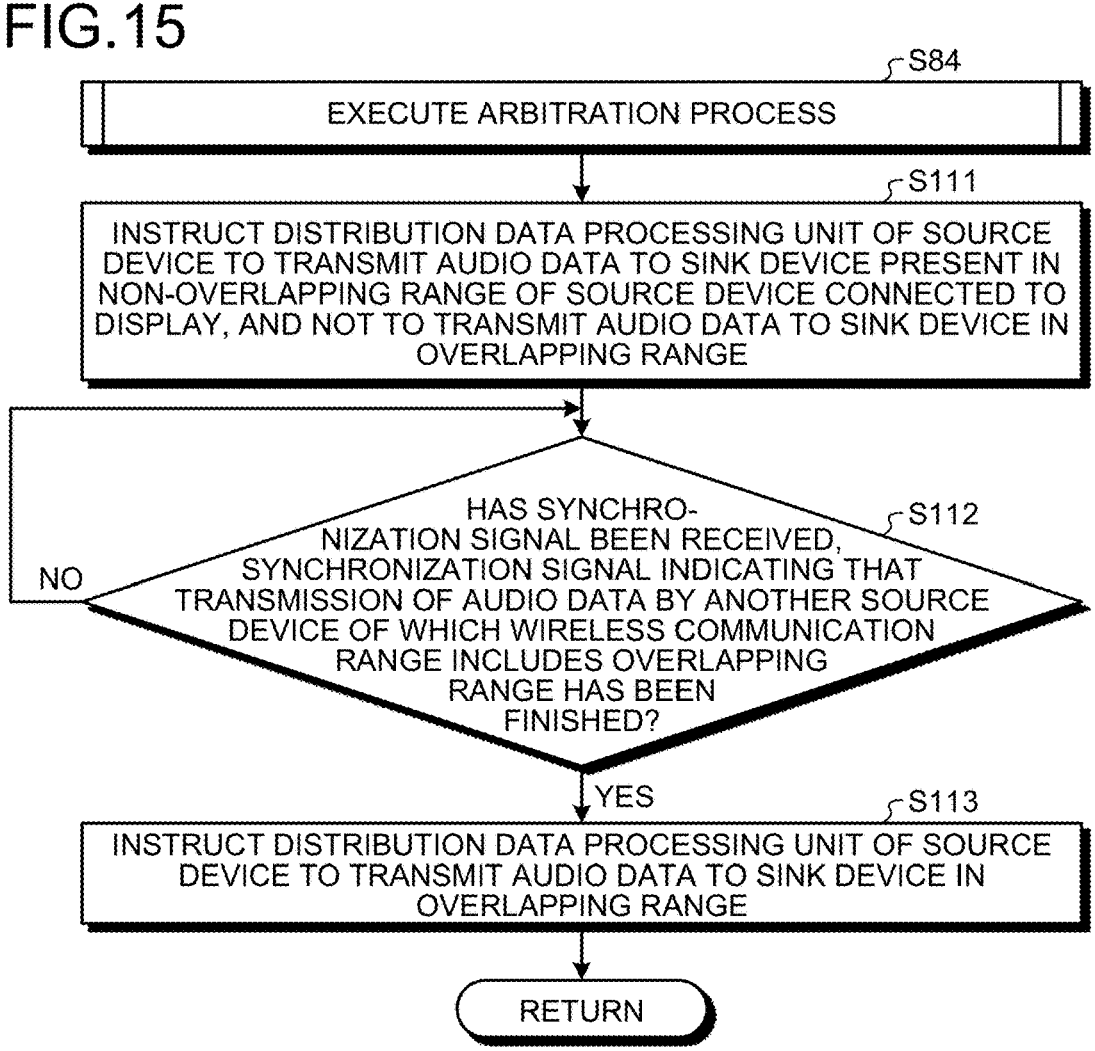
FIG. 15 is a flowchart illustrating an example of a procedure of an arbitration process of the communication system according to the third embodiment.

FIG. 15 is a flowchart illustrating an example of a procedure of an arbitration process of the communication system according to the third embodiment. The data control unit 16 of the display 10a instructs the distribution data processing unit 23 of the source device 20a to transmit the audio data 110a to a sink device present in the non-overlapping range of the source device 20a connected to the display 10a, and not to transmit the audio data 110a to the sink device 30b in the overlapping range 211 (step S111). Consequently, the distribution data processing unit 23 of the source device 20a performs a distribution process of the audio data 110a to the sink device in the non-overlapping range.

Thereafter, the data control unit 16 of the display 10a determines whether a synchronization signal has been received, the synchronization signal indicating that the transmission of the audio data 110b by the source device 20b as another source device of which the wireless communication range 210b includes the overlapping range 211 has been finished (step S112). If the synchronization signal has not been received (No in step S112), a standby state is entered. If the synchronization signal has been received (Yes in step S112), the data control unit 16 instructs the distribution data processing unit 23 of the source device 20a to transmit the audio data 110a to the sink device 30b in the overlapping range 211 (step S113). Consequently, the distribution data processing unit 23 of the source device 20a performs the distribution process of the audio data 110a to the sink device 30b in the overlapping range 211. As described above, the sink device 30a is not a destination of the distribution of the audio data 110a due to the set access level. Then, the process returns to FIG. 14.

Figure 16:
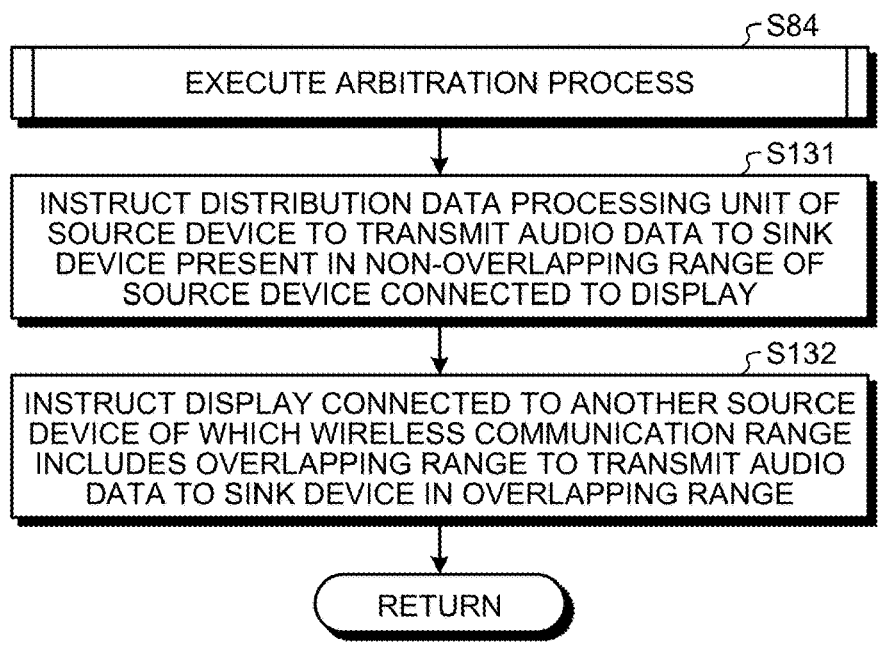
FIG. 16 is a flowchart illustrating another example of the procedure of the arbitration process of the communication system according to the third embodiment.

FIG. 16 is a flowchart illustrating another example of the procedure of the arbitration process of the communication system according to the third embodiment. The data control unit 16 of the display 10a instructs the distribution data processing unit 23 of the source device 20a to transmit the audio data 110a to a sink device present in the non-overlapping range of the source device 20a connected to the display 10a (step S131). In addition, the data control unit 16 instructs the display 10b connected to the source device 20b as another source device of which the wireless communication range 210b includes the overlapping range 211 to transmit the audio data 110a to the sink device 30b in the overlapping range 211 (step S132). Consequently, the source device 20b as another source device executes the transmission of the audio data 110a to the sink device 30b in the overlapping range 211 as a proxy for the source device 20a. Then, the process returns to FIG. 14.

Referring back to FIG. 14, after the arbitration process in step S84, the network connection unit 11 of the display 10a transmits the latest sink device information in the source device 20a of the display 10a to the display 10b as another display having the source device 20b in the network (step S85). Then, the process returns to step S71.

Figure 17:
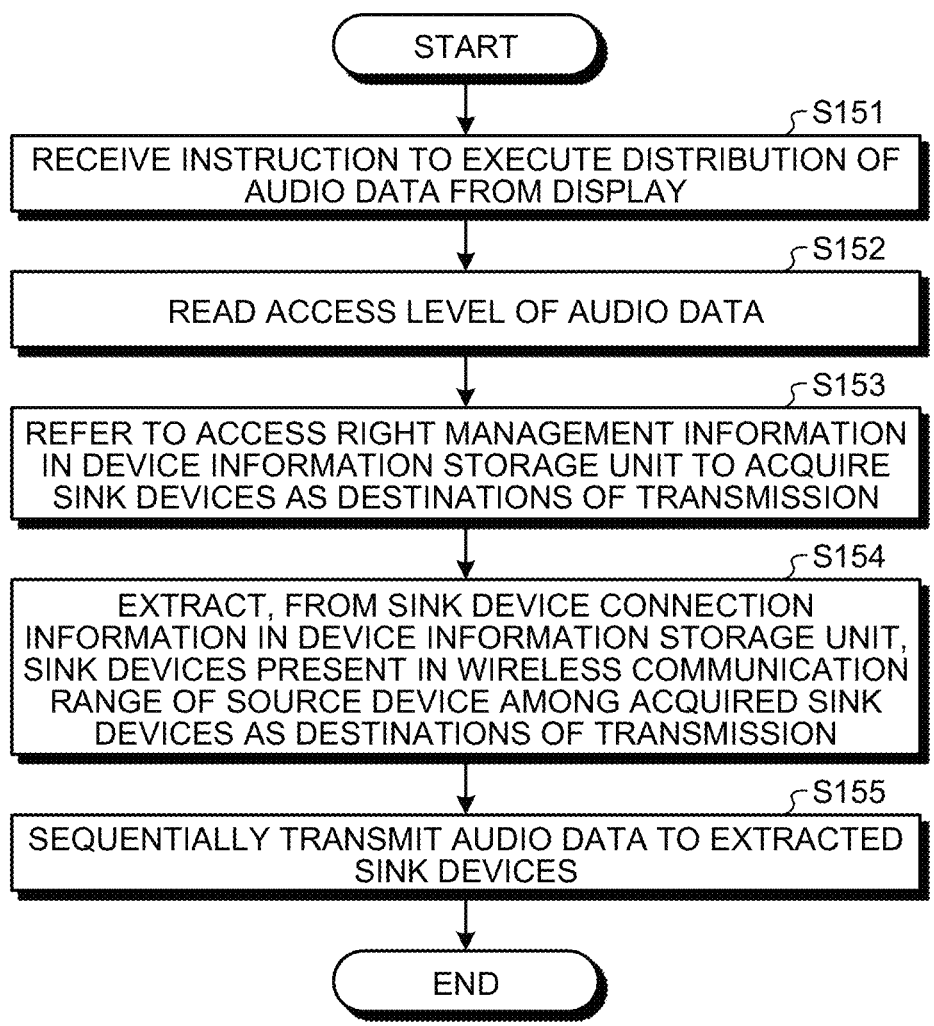
FIG. 17 is a flowchart illustrating an example of a procedure of a data distribution process performed by the source device of the communication system according to the third embodiment.

Here, a description will be given for a process performed by the source device 20a when the data control unit 16 instructs the distribution data processing unit 23 of the source device 20a to transmit the audio data 110a in steps S83, S113, and S131. FIG. 17 is a flowchart illustrating an example of a procedure of a data distribution process performed by the source device of the communication system according to the third embodiment. When receiving an instruction to execute the distribution of the audio data 110a from the data control unit 16 of the display 10a (step S151), the distribution data processing unit 23 of the source device 20a reads the access level of the audio data 110a (step S152). The distribution data processing unit 23 refers to the access right management information in the device information storage unit 22 to acquire the sink devices 30b as destinations of transmission (step S153). In addition, from the sink device connection information in the device information storage unit 22, the distribution data processing unit 23 extracts the sink devices 30b present in the wireless communication range 210a of the source device 20a among the acquired sink devices 30b as destinations of transmission (step S154).

Thereafter, the distribution data processing unit 23 sequentially transmits the audio data 110a to the extracted sink devices 30b (step S155). In one example, in the case of the first embodiment, the audio data 110a including the device-specific information of the source device 20a and the device-specific information of the sink device 30b as a destination of transmission is transmitted. Consequently, the sink device 30b performs a reception process only on the audio data 110a including the device-specific information of the source device 20a held by the sink device 30b and the device-specific information of the sink device 30b. In addition, in the case of the second embodiment, the audio data 110a including the virtual identifier and the device-specific information of the sink device 30b as a destination of transmission is transmitted. Consequently, the sink device 30b performs a reception process only on the audio data 110a including the virtual identifier held by the sink device 30b and the device-specific information of the sink device 30b. In this manner, it is possible to switch the contents and conditions of the audio data 110a to be transmitted to the sink device 30a depending on the access level. Thus, the process ends.

Although the case of the unidirectional transfer of the audio data 110a and 110b from the source devices 20a and 20b to the sink devices 30a and 30b has been delineated in the above description, a control signal input from the input unit 32 of each of the sink devices 30a and 30b may be transmitted from the sink devices 30a and 30b to the source devices 20a and 20b. Examples of the control signal include an instruction to play back or stop the audio data 110a and 110b, and volume control. In Bluetooth standards, such a control signal is defined in audio/video remote control profile (AVRCP).

In addition, the number of sink devices 30a and 30b connected to one source device 20 is limited in Bluetooth. In one example, the number thereof is limited to seven. Therefore, in a case where there are more than seven sink devices 30a and 30b present in the wireless communication range 210 of one source device 20, it is not possible to connect to all the sink devices 30a and 30b. In that case, a process is repeatedly performed which includes disconnecting the connection to the sink devices 30a and 30b for which the distribution of the audio data 110a and 110b has been finished, connecting to unconnected another sink device by using the pairing authentication information, and distributing the audio data 110a and 110b. In that case, the sink devices 30a and 30b having a higher priority may be preferentially connected to the source devices 20a and 20b. In one example, the priority can be set so that the more access levels the sink devices 30a and 30b are registered at in the access right management information, the higher priority the sink devices 30a and 30b have.

In a case where while the source device 20b is transmitting the audio data 110b to the sink device 30b, the source device 20a transmits the audio data 110a as different audio data to the sink device 30b, since the sink device 30b can receive only the audio data 110b from one source device 20b, the sink device 30b cannot receive the audio data 110a from the source device 20a as another source device. In particular, the audio data 110a and 110b transmitted in the factory are important information such as alarm information, and thus it is not preferable that there may be a case where the audio data 110a is not delivered to the sink device 30b.

Therefore, in the third embodiment, in the case where while the source device 20b is transmitting the audio data 110b to the sink device 30b, the source device 20a transmits the audio data 110a as different audio data to the sink device 30b, the distribution of the audio data 110a and 110b is arbitrated between the display 10a to which the source device 20a is connected and the display 10b to which the source device 20b is connected, and the audio data 110a and 110b are transmitted. Specifically, in a case where there is the source device 20b that transmits the audio data 110b first, the source device 20a transmits the audio data 110a to the sink device 30b present in the overlapping range 211 after receiving, from the source device 20b, a synchronization signal indicating that the transmission by the source device 20b to the sink device 30b present in the overlapping range 211 has been finished. Alternatively, in the case where there is the source device 20b that transmits the audio data 110b first, the source device 20b is requested to transmit the audio data 110a to the sink device 30b present in the overlapping range 211. Consequently, the audio data 110a can be transmitted to the sink device 30b present in the overlapping range 211. That is, there is an effect that important information for the sink device 30b can be prevented from missing.

In addition, in the third embodiment, in a case where the display 10a generates the audio data 110a for a sink device present in the wireless communication range 210b of the source device 20b as another source device, the display 10a requests the display 10b to which the source device 20b is connected to transmit the audio data 110a. Then, the display 10b transmits the audio data 110a to the sink device via the source device 20b. Consequently, even in a case where the sink device 30a as a destination is not present in the wireless communication range 210a of the source device 20a of the display 10a, the audio data 110a can be delivered to a sink device as long as the sink device is present in the factory.

In addition, access levels are set for the audio data 110a and 110b, and the audio data 110a and 110b are transmitted to the sink devices 30a and 30b associated with the access levels. Consequently, the sink devices 30a and 30b can transmit information to the plurality of source devices 20a and 20b at an appropriate level without synchronizing with the source devices 20a and 20b to acquire only the audio data 110a and 110b for the sink devices 30a and 30b, or performing a mute process in a case of receiving the audio data 110a and 110b other than the audio data 110a and 110b for the sink devices 30a and 30b.

Although the case where the source device 20 is connected to the display 10 has been delineated in the above description, each embodiment is not limited thereto. The device to which the source device 20 is connected is only required to be a control device that can generate data and distribute the generated data to the sink devices 30a and 30b. That is, the device is only required to be a control device obtained by removing a function related to display from the display 10.

In addition, although the case where one source device 20 is connected to the display 10 has been described, a plurality of source devices 20 may be connected to the display 10.

Figure 18:
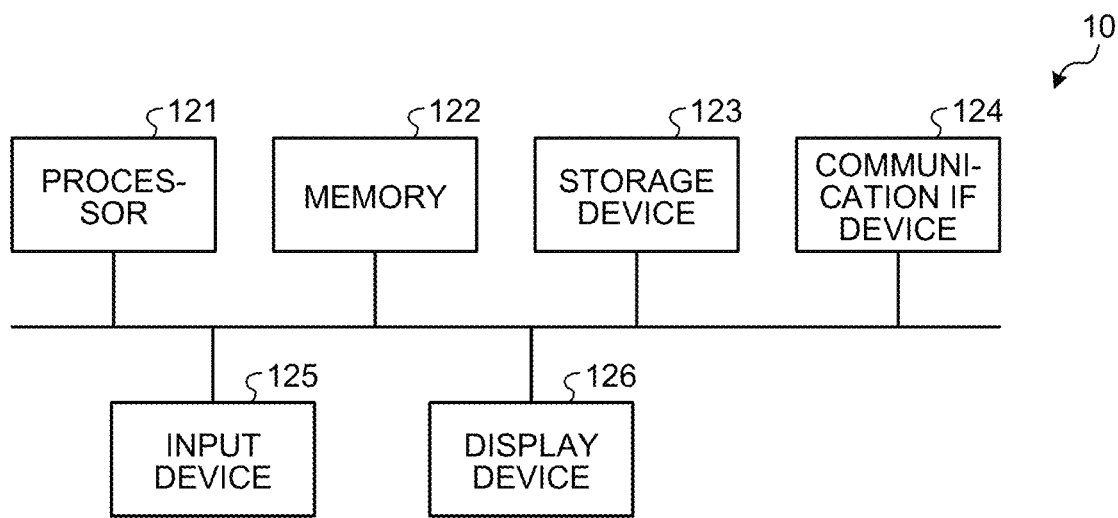
FIG. 18 is a block diagram schematically illustrating a hardware configuration of the display according to the first to third embodiments.

FIG. 18 is a block diagram schematically illustrating a hardware configuration of the display according to the first to third embodiments. The display includes a processor 121 that processes instructions of various programs, a memory 122, a storage device 123, a communication interface (IF) device 124, an input device 125, and a display device 126.

Examples of the processor 121 include a central processing unit (CPU, also referred to as a processing device, an arithmetic device, a microprocessor, a microcomputer, or a digital signal processor (DSP)), and system large scale integration (LSI).

The memory 122 is a main storage device such as a random access memory (RAM). The storage device 123 is a nonvolatile memory such as a read only memory (ROM), a flash memory, an erasable programmable read only memory (EPROM), or an electrically erasable programmable read only memory (EEPROM (registered trademark)). The storage device 123 stores programs such as a control program for operating the display 10. This program may be recorded on a computer-readable recording medium and provided as, for example, a computer program product, or may be downloaded on the display 10 via a network or the like. The memory 122 is a high-speed readable/writable memory that temporarily stores, for example, an intermediate result of calculation performed by the processor 121.

The processor 121 performs various types of processes in accordance with programs stored in the storage device 123 or programs stored in the memory 122. In addition, the processor 121 temporarily or permanently stores data required for respective processes in the memory 122 or the storage device 123.

The display 10 is realized by the processor 121 reading, from the storage device 123, a computer-executable communication program for distributing audio data to the sink devices 30a and 30b in concert with another display 10 and executing the communication program. It can also be said that the communication program, which is a program for executing transmission of audio data to the sink devices 30a and 30b in the display 10, causes a computer to execute procedures or methods of the display 10 in FIGS. 5, 6, and 13 to 16.

The processor 121 controls the entirety of the display 10. That is, the display generation unit 14, the content generation unit 13, and the data control unit 16 of the display 10 are realized by the processor 121. In other words, the communication program executed by the display 10 has a module configuration including the display generation unit 14, the content generation unit 13, and the data control unit 16, and these are loaded on the memory 122 which is a main storage device, and generated on the memory 122. Note that a part of the functions of the display 10 may be realized by dedicated hardware such as a dedicated circuit and another part thereof may be realized by software or firmware.

In addition, a part or all of the display generation unit 14, the content generation unit 13, and the data control unit 16 may be realized by processing circuitry such as a system LSI, or may be realized by cooperation of a plurality of processing circuitry.

The communication IF device 124 communicates with external devices such as another display 10, a production device, and the source device 20. The communication IF device 124 performs input and output of data to and from the external devices. The communication IF device 124 executes a process of the network connection unit 11. That is, the communication IF device 124 performs communication by using, for example, Ethernet (registered trademark), a serial port, or a USB.

The input device 125 executes a process of the input unit. The input device 125 is, for example, a touch panel, a software keyboard, a numeric keypad, or a keyboard of the display device 126, and is a device to which various operations from a user are input.

The display device 126 is a device that displays various types of information, and is, for example, a liquid crystal display (LCD), a plasma display panel (PDP), or a cathode-ray tube (CRT) display.

Figure 19:
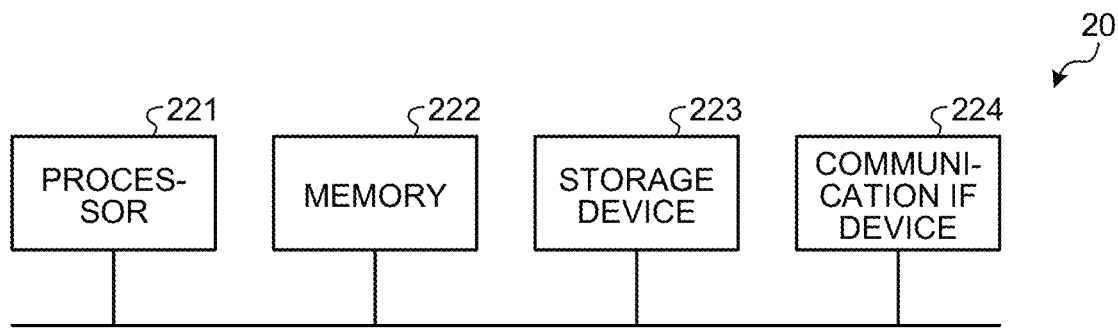
FIG. 19 is a block diagram schematically illustrating a hardware configuration of the source device according to the first to third embodiments.

FIG. 19 is a block diagram schematically illustrating a hardware configuration of the source device according to the first to third embodiments. The source device 20 includes a processor 221 that processes instructions of various programs, a memory 222, a storage device 223, and a communication IF device 224.

An example of the processor 221 is a CPU or a system LSI.

The memory 222 is a main storage device such as a RAM. The storage device 223 is a nonvolatile memory such as a ROM, a flash memory, an EPROM, or an EEPROM. The storage device 223 stores programs such as a control program for operating the source device 20. This program may be recorded on a computer-readable recording medium and provided as, for example, a computer program product. In that case, the program is installed on the source device 20 via a computer to which the source device 20 is connected. In addition, this program may be downloaded on a computer via a network or the like. In that case, the program is installed on the source device 20 from the computer to which the source device 20 is connected. The memory 222 is a high-speed readable/writable memory that temporarily stores, for example, an intermediate result of calculation performed by the processor 221.

The processor 221 performs various types of processes in accordance with programs stored in the storage device 223 or programs stored in the memory 222. In addition, the processor 221 temporarily or permanently stores data required for respective processes in the memory 222 or the storage device 223.

The source device 20 is realized by reading, from the storage device 223, a computer-executable communication program for performing wireless communication with the sink devices 30a and 30b under the control of the display 10 and executing the communication program. It can also be said that the communication program, which is a program in the source device 20 for performing wireless communication with the sink devices 30a and 30b under the control of the display 10, causes a computer to execute procedures or methods of the source device 20 in FIGS. 6 and 17.

The processor 221 controls the entirety of the source device 20. That is, the distribution data processing unit 23 and the pairing processing unit 24 of the source device 20 are realized by the processor 221. In other words, the communication program executed by the source device 20 has a module configuration including the distribution data processing unit 23 and the pairing processing unit 24, and these are loaded on the memory 222 which is a main storage device, and generated on the memory 222. Note that a part of the functions of the source device 20 may be realized by dedicated hardware such as a dedicated circuit and another part thereof may be realized by software or firmware.

In addition, a part or all of the distribution data processing unit 23 and the pairing processing unit 24 may be realized by processing circuitry such as a system LSI, or may be realized by cooperation of a plurality of processing circuitry.

The communication IF device 224 communicates with external devices such as the display 10 and the sink devices 30a and 30b. The communication IF device 224 performs input and output of data to and from the external devices such as the display 10. In addition, the communication IF device 224 performs input and output of data to and from the sink devices 30a and 30b by wireless communication. The communication IF device 224 communicates with the display 10 using a USB, and executes a process of the RF unit 21 with respect to the sink devices 30a and 30b.

The configurations described in the above embodiments are merely examples and can be combined with other known technology, the embodiments can be combined with each other, and part of the configurations can be omitted or modified without departing from the gist thereof.

REFERENCE SIGNS LIST 1 communication system; 10, 10a, 10b display; 11 network connection unit; 12, 36 data storage unit; 13 content generation unit; 14 display generation unit; 15 display unit; 16, 37 data control unit; 20, 20a, 20b source device; 21, 31 RF unit; 22 device information storage unit; 23, 33 distribution data processing unit; 24, 35 pairing processing unit; 30a, 30b sink device; 32 input unit; 34 sink device connection information storage unit; 38 output unit; 110a, 110b audio data; 200 virtual source device; 210, 210a, 210b wireless communication range; 211 overlapping range.

The invention claimed is:

1. A communication system comprising: a first device capable of receiving data; and a plurality of second devices capable of wirelessly communicating with the first device, the plurality of second devices being connected via a network, wherein each of the second devices includes:

a wireless communication circuitry to perform wireless communication with the first device present in a wireless communication range that is a range in which the second device is capable of performing wireless communication;

a pairing processing circuitry to perform a pairing process including an authentication process with the first device by using device-specific information that is information specific to the second device;

a device information storage circuitry to store device information including pairing authentication information that is information obtained by the pairing process and information used in wireless communication between the second device and the first device; and a data control circuitry to control a flow of data in the second device, the pairing processing circuitry performs, by using device-specific information of another second device in the network, the pairing process between the first device and the another second device as a proxy for the another second device, and stores the pairing authentication information regarding the another second device in the device information storage circuitry, the data control circuitry transmits the pairing authentication information stored in the device information storage circuitry to the another second device via the network, and the data control circuitry of the another second device stores the pairing authentication information that has been received in the device information storage circuitry.

2. The communication system according to claim 1, wherein the device information further includes pairing result information that is information indicating a result regarding performance of the pairing process between the first device and each of the second device and the another second device, and the pairing processing circuitry of the second device refers to connected device information that is information on a device connected to the second device to extract the second devices connected to the network, and in a case where among the extracted second devices connected to the network, there is the another second device on which the pairing process with the first device has not been performed with reference to the pairing result information, the pairing processing circuitry performs by proxy the pairing process of the first device and the another second device.

3. The communication system according to claim 2, wherein after the pairing process, the pairing processing circuitry of the second device registers, in the pairing result information in the device information storage circuitry, that the pairing process between the first device and the another second device has been performed.

4. The communication system according to claim 3, wherein the data control circuitry of the second device transmits, to the another second device in the network, the pairing authentication information and the pairing result information registered in the device information storage circuitry, and the data control circuitry of the another second device stores, in the device information storage circuitry, the pairing authentication information and the pairing result information from the second device.

5. The communication system according to claim 1, wherein each of the second devices further includes:

a content generation circuitry to generate distribution data to be distributed to the first device; and a distribution data processing circuitry to distribute the distribution data to the first device.

6. The communication system according to claim 5, wherein the data control circuitry of the second device refers to the device information stored in the device information storage circuitry, and transmits the distribution data to the another second device in a case where the first device is connected to the another second device.

7. The communication system according to claim 5, wherein in a case where the first device is present in an overlapping range in which the wireless communication range of the second device and the wireless communication range of the another second device overlap, and distribution of another distribution data by the another second device and distribution of the distribution data by the second device are performed with respect to the first device, the data control circuitry of the second device does not distribute the distribution data from the second device to the first device, and, after the distribution of the another distribution data to the first device by the another second device is finished, the data control circuitry of the second device instructs the distribution data processing circuitry of the second device to distribute the distribution data to the first device.

8. The communication system according to claim 5, wherein in a case where the first device is present in an overlapping range in which the wireless communication range of the second device and the wireless communication range of the another second device overlap, and distribution of another distribution data by the another second device and distribution of the distribution data by the second device are performed with respect to the first device, the data control circuitry of the second device transmits the distribution data to the another second device and requests the another second device to distribute the distribution data to the first device.

9. The communication system according to claim 5, wherein the content generation circuitry of the second device generates the distribution data including an access level that specifies the first device as a destination of distribution with respect to a type of the distribution data, the device information further includes access right management information that specifies the first device as a destination of distribution with respect to the access level, and the distribution data processing circuitry of the second device reads the access level of the distribution data, and refers to the access right management information to distribute the distribution data to the first device corresponding to the access level that has been read.

10. The communication system according to claim 5, wherein each of the second devices includes:

a third device including the wireless communication circuitry, the pairing processing circuitry, the device information storage circuitry, and the distribution data processing circuitry, and capable of wirelessly communicating with the first device; and a fourth device including the content generation circuitry and the data control circuitry, and connected to the third device.

11. A communication system comprising: a first device capable of receiving data; and a plurality of second devices capable of wirelessly communicating with the first device, the plurality of second devices being connected via a network, wherein each of the second devices includes:
a wireless communication circuitry to perform wireless communication with the first device present in a wireless communication range that is a range in which the second device is capable of performing wireless communication;
a pairing processing circuitry to set the plurality of second devices in the network as one virtual second device, and to perform a pairing process including an authentication process with the first device by using a virtual identifier attached to the virtual second device;
a device information storage circuitry to store device information including pairing authentication information that is information obtained by the pairing process and information used in wireless communication between the second device and the first device; and
a data control circuitry to control a flow of data in the second device,
the first device includes:
a wireless communication circuitry to perform wireless communication with the second device;
a first device connection information storage circuitry to store information including first device-side pairing authentication information that is information obtained by the pairing process; and
a pairing processing circuitry to perform a pairing process including an authentication process with the second device by using device-specific information that is information specific to the first device, and to register the virtual identifier received from the second device in the first device-side pairing authentication information,
the data control circuitry of the second device transmits the pairing authentication information stored in the device information storage circuitry to another second device via the network, and
the data control circuitry of the another second device stores the pairing authentication information that has been received in the device information storage circuitry.

12. The communication system according to claim 11, wherein
each of the second devices further includes:
a content generation circuitry to generate distribution data to be distributed to the first device; and
a distribution data processing circuitry to distribute the distribution data to the first device.

13. The communication system according to claim 12, wherein the data control circuitry of the second device refers to the device information stored in the device information storage circuitry, and transmits the distribution data to the another second device in a case where the first device is connected to the another second device.

14. The communication system according to claim 12, wherein in a case where the first device is present in an overlapping range in which the wireless communication range of the second device and the wireless communication range of the another second device overlap, and distribution of another distribution data by the another second device and distribution of the distribution data by the second device are performed with respect to the first device, the data control circuitry of the second device does not distribute the distribution data from the second device to the first device, and, after the distribution of the another distribution data to the first device by the another second device is finished, the data control circuitry of the second device instructs the distribution data processing circuitry of the second device to distribute the distribution data to the first device.

15. The communication system according to claim 12, wherein in a case where the first device is present in an overlapping range in which the wireless communication range of the second device and the wireless communication range of the another second device overlap, and distribution of another distribution data by the another second device and distribution of the distribution data by the second device are performed with respect to the first device, the data control circuitry of the second device transmits the distribution data to the another second device and requests the another second device to distribute the distribution data to the first device.

16. The communication system according to claim 12, wherein
the content generation circuitry of the second device generates the distribution data including an access level that specifies the first device as a destination of distribution with respect to a type of the distribution data,
the device information further includes access right management information that specifies the first device as a destination of distribution with respect to the access level, and
the distribution data processing circuitry of the second device reads the access level of the distribution data, and refers to the access right management information to distribute the distribution data to the first device corresponding to the access level that has been read.

17. The communication system according to claim 12, wherein
each of the second devices includes:
a third device including the wireless communication circuitry, the pairing processing circuitry, the device information storage circuitry, and the distribution data processing circuitry, and capable of wirelessly communicating with the first device; and
a fourth device including the content generation circuitry and the data control circuitry, and connected to the third device.

18. A device that is capable of wirelessly communicating with a sink device capable of receiving data, the device comprising:
a wireless communication circuitry to perform wireless communication with the sink device present in a wireless communication range that is a range in which the device is capable of performing wireless communication;
a pairing processing circuitry to perform a pairing process including an authentication process with the sink device by using device-specific information that is information specific to the device;
a device information storage circuitry to store device information including pairing authentication information that is information obtained by the pairing process and information used in wireless communication between the device and the sink device; and
a data control circuitry to control a flow of data in the device, wherein
the pairing processing circuitry performs, by using device-specific information of another device connected to the device via a network, the pairing process between the sink device and the another device as a proxy for the another device, and stores the pairing authentication information regarding the another device in the device information storage circuitry, and
the data control circuitry transmits the pairing authentication information stored in the device information storage circuitry to the another device via the network in order to store the pairing authentication information in the device information storage circuitry of the another device.

19. A device capable of wirelessly communicating with a sink device capable of receiving data, the device comprising:
a wireless communication circuitry to perform wireless communication with the sink device present in a wireless communication range that is a range in which the device is capable of performing wireless communication;
a pairing processing circuitry to set a plurality of the devices in the network as one virtual device, and to perform a pairing process including an authentication process with the sink device by using a virtual identifier attached to the virtual device;
a device information storage circuitry to store device information including pairing authentication information that is information obtained by the pairing process and information used in wireless communication between the device and the sink device; and
a data control circuitry to control a flow of data in the device, wherein
the data control circuitry transmits the pairing authentication information stored in the device information storage circuitry to another device via the network in order to store the pairing authentication information in the device information storage circuitry of the another device.

* * * * *